US006256291B1

(12) United States Patent
Araki

(10) Patent No.: US 6,256,291 B1
(45) Date of Patent: Jul. 3, 2001

(54) METHOD OF SWITCHING BETWEEN REDUNDANT ROUTES IN COMMUNICATION SYSTEM DEVOID OF REDUNDANT TRANSMISSION

(75) Inventor: Hirofumi Araki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/041,759

(22) Filed: Mar. 13, 1998

(51) Int. Cl.[7] .......... H04J 1/16

(52) U.S. Cl. .......... 370/216; 370/225; 370/242; 370/248; 340/825.01

(58) Field of Search .......... 370/216, 225, 370/242, 248; 340/825.01, 827

(56) References Cited

U.S. PATENT DOCUMENTS

| | | | | |
|---|---|---|---|---|
| 5,406,255 | * | 4/1995 | Fujimoto | 340/522 |
| 5,905,585 | * | 5/1999 | Shiral | 359/110 |
| 6,038,211 | * | 3/2000 | Lemaire | 370/216 |
| 6,057,948 | * | 5/2000 | Mizrahi | 359/110 |

FOREIGN PATENT DOCUMENTS

| | | |
|---|---|---|
| 0 721 275 A2 | 7/1996 | (EP) . |
| 0 721 275 A3 | 7/1996 | (EP) . |
| 2 749 725 A1 | 12/1997 | (FR) . |
| 55-102952 | 8/1980 | (JP) . |
| 56-89148 | 7/1981 | (JP) . |
| 4-65937 | 3/1992 | (JP) . |

OTHER PUBLICATIONS

XP–002144924 ITV–T G.842, Interworking of SDH Network Protection Architectures (Apr. 1997).

XP–002144923 Demeester P. et al.: Panel–Protection Across Network Layers (1997).

XP–000829429 Garavaglta A. et al.: A New Protocol for SDH–Over–WDM Failure Propagation (1999).

* cited by examiner

*Primary Examiner*—Hassan Kizou
*Assistant Examiner*—Roberta Stevens
(74) *Attorney, Agent, or Firm*—Staas & Halsey LLP

(57) ABSTRACT

Disclosed is a method of switching between redundant routes of a communication system in which terminal stations are connected by an uplink transmission line and a downlink transmission line that are devoid of redundancy. The method includes adopting working/protection redundancy for first and second apparatuses constituting each terminal station, detecting line failure, which has occurred on the side of the first terminal station, by the second terminal station, multiplexing additional data, which includes a line failure alarm, onto main signal sent from the second terminal station to the first terminal station (or inserting the line failure alarm in the form of overhead bytes), and causing the first terminal station to perform line switching upon detecting the alarm included in the additional data or overhead bytes.

8 Claims, 16 Drawing Sheets

FIG. 11

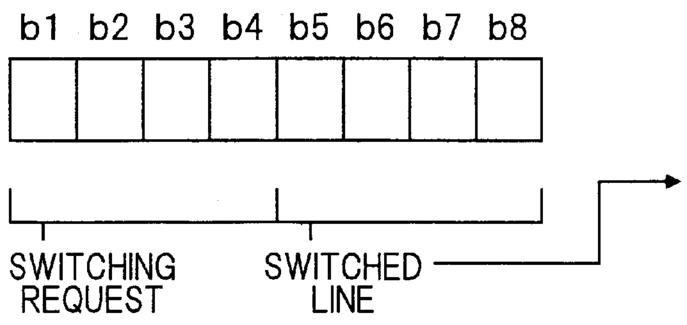

| b5-8 | |
|---|---|
| 0000 | USED WHEN PTCT IS NOT USED, WHEN PTCT FAILS AND WHEN LOCKOUT OF PROTECTION IS REQUESTED |
| 0001 ~ 1110 | SPECIFIES WK1 ~ WK14 |
| 1111 | EXTRA TRAFFIC CHANNEL (LOW-PRIORITY TRAFFIC) |

| b1-4 | SWITCHING REQUEST | REMARKS | | | |
|---|---|---|---|---|---|
| 1111 | LOCKOUT OF PROTECTION | | 0111 | — | |
| 1110 | FORCED SWITCH | | 0110 | WAIT-TO-RESTORE | 1+1 NON-REV NOT USED |
| 1101 | SF(HIGH PRIORITY) | ONLY 1:n | 0101 | — | |
| 1100 | SF(LOW PRIORITY) | | 0100 | EXERCISER | (OK NOT TO USE?) |
| 1011 | SD(HIGH PRIORITY) | ONLY 1:n | 0011 | — | |
| 1010 | SD(LOW PRIORITY) | | 0010 | REVERSE REQUEST | ONLY BIDIRECTIONAL |
| 1001 | — | | 0001 | DO NOT REVERT | ONLY 1+1 NON-REV |
| 1000 | MANUAL SWITCH | | 0000 | NO REQUEST | 1+1 NON-REV NOT USED |

FIG. 12

| BITS | |
|---|---|
| $b_1 \sim b_4$ | ·NULL IN CASE WHERE RECEIVED K1 BYTE IS NULL CHANNEL (0)<br>·CHANNEL NUMBER BRIDGED FOR PROTECTION IN OTHER CASES |
| $b_5$ | · "1" ··· 1+1 NETWORK<br>· "0" ··· 1:N NETWORK |
| $b_6 \sim b_8$ | · "101" ··· BIDIRECTIONAL SWITCHING<br>· "100" ··· UNIDIRECTIONAL SWITCHING<br>· "011", "010", "001" ··· 1:n D/I PROTECTION SWITCHING<br>· "111" ··· AIS(ALARM INDICATION SIGNAL)<br>· "110" ··· FERF(FAR END RECEIVE FAILURE) |

METHOD OF SWITCHING BETWEEN REDUNDANT ROUTES IN COMMUNICATION SYSTEM DEVOID OF REDUNDANT TRANSMISSION

BACKGROUND OF THE INVENTION

This invention relates to a method of switching between redundant routes of a communication system not having redundant transmission lines. More particularly, the invention relates to a method of switching between redundant routes of a communication system in which terminal stations having a redundant structure are connected by two transmission lines, namely uplink and downlink transmission lines, not having a redundant structure.

In an optical transmission system, a 1+1 line switching point-to-point system is constructed by adding a switch controller to a 1+1 configuration having one working line and one protection line, or a 1:N line switching point-to-point system is constructed by adding a switch controller to a 1:N configuration having N working lines and one protection line. When a working line fails, a changeover is effected to a protection line so that communication can continue.

The sending and receiving of information relating to the switching of optical signal lines is stipulated by the international standard (SONET) regarding SDH (Synchronous Digital Hierarchy). It is so arranged that K1/K2 bytes are used in overhead bytes OHB.

FIG. 10A is a diagram useful in describing a SONET STS-3 (OC-3) frame format. One frame is composed of 9×270 bytes. The first 9×9 bytes constitute section overhead (SOH), and the remaining bytes constitute path overhead (POH) and payload (PL). The section overhead SOH is the part of the frame that sends information (a frame synchronizing signal) representing the beginning of the frame, information specific to the transmission line (such as information which checks for error at the time of transmission and information for maintenance of the network), and a pointer which indicates the position of the path overhead POH. Further, path overhead POH is the part of the frame that sends end-to-end monitoring information in the network. The payload PL sends information at 150 Mbps.

The section overhead SOH is composed of repeater section overhead of 3×9 bytes, a pointer of 1×9 bytes and multiplex section overhead of 5×9 bytes. As shown in FIG. 10B, the repeater section overhead has bytes A1~A2, C1, B1, E1, F1, D1 ~D3, and the multiplex section overhead has bytes B2, K1~K2, D4 D12, S1, Z1~Z2. The repeater section overhead and the multiplex section overhead each have a large number of undefined bytes the use of which is left to the particular communications concern.

The K1 byte among the overhead bytes is used mainly to request switching and designates the level of the switch request and the switched line. The K2 byte is used mainly to respond to the K1 byte and is employed also to represent system architecture, switching mode and AIS (Alarm Indication Signal)/FERF (Far End Receive Failure). Switching requests include, in addition to a request for switching at the time of signal failure, a switching request based upon forced switching and manual switching. FIGS. 11 and 12 illustrate the bits of the K1/K2 bytes stipulated by the SONET standard, as well as the meanings thereof.

K1 Byte

The first four bits b1~b4 of the K1 byte represent the switching request, and the remaining four bits b5~b8 represent the switched line and are capable of specifying a maximum of 14 transmission lines. "Lockout of Protection" is a switch request that prohibits switching to a protection transmission line. "Forced Switching" is a request for switching of an artificially designated transmission line. If a switch has been made, a switch will not be made to another a line even if a fault has occurred there. "SF" (Signal Failure) is a switching request for when a transmission line loses it signal. This request has two priorities, namely high and low. "SD" (Signal Degradation) is a switch request based upon signal degradation of a transmission line and has two priorities, namely high and low. The SF switching request has a higher priority than that of the SD switching request. "Manual Switching" is an artificial switching request. If a fault occurs somewhere, priority is given to switching of this location. "Wait to Restore" is a request wherein, even if a switch-back request is issued following restoration of a faulty line, switch-back is performed upon elapse of a predetermined period of time. "Exerciser" performs an actual switching to self-diagnose whether switching will be performed normally. "No Request" is sent when the situation is normal or when bridging is canceled.

K2 Byte

The first four bits b1~b4 of the K2 byte specify a transmission line number and are nulled (0000) in a case where the bits b5~b8 of a received K1 byte are null. In other cases these bits represent the number of the transmission line to which a changeover has been made. The b5 bit indicates the network configuration; "1" indicates a 1+1 system and "0" a 1:N system. The b6~b8 bits indicate the category of the switching mode, the specifics of the fault, etc. There are two types of switching modes, namely a unidirectional mode, in which only a signal in one direction is changed over, and a bidirectional mode, in which signals in both directions are changed over simultaneously.

Switching Sequence Using K1, K2 Bytes

In the case of the unidirectional mode, the K1 byte (switching request) is sent to a station A if a station B detects SF, as shown in FIG. 13A. The station A performs bridging control in regard to the line specified by the K1 byte (switching request) that has been received. Bridging control is control for sending identical signals to both working and protection lines. After performing bridging control, the station A transmits the K2 byte (switching response), which is in response to the received K1 byte, to the opposing station (station B). Upon receiving the K2 byte, the station B performs switching control. Switching control is control for switching a designated line signal in the receiving direction to a protection line.

In the case of the bidirectional mode, the K1 byte (switching request) is sent to station A if station B detects SF, as shown in FIG. 13B. Station A performs bridging control in regard to the line specified by the K1 byte (switching request) that has been received, sends back the K2 byte (switching response) in the same manner as in the unidirectional mode and, at the same time, sends the K1 byte designating "reverse request" (RR). Upon receiving RR, station B performs switching control and bridging control in regard to the line that was designated by the K1 byte sent by the B station itself and sends the K2 byte (switching response) to the opposing station (station A). Upon receiving the K2 byte, station A performs switching control.

FIG. 14 is a diagram useful in describing the details of switching based upon line protection using the K1 and K2 bytes. Shown in FIG. 14 are a terminal station (station A) 1, a terminal station (station B) 2 opposing the station A, a working transmission line 3 comprising a working uplink line 3*a* and a working downlink line 3*b*, and a protection transmission line 4 comprising a protection uplink line 4*a* and a protection downlink line 4*b*.

The terminal station (station A) 1 includes a multiplexer/demultiplexer 1*a*, working and protection transmitters (TX-W, TX-P) 1*b*, 1*c*, respectively, which send exactly identical signals, and working and protection receivers (RX-W, RX-P) 1*d*, 1*e*, respectively, which receive exactly identical signals. The terminal station (station B) 2 includes a multiplexer/demultiplexer 2*a*, working and protection transmitters (TXW, TX-P) 2*b*, 2*c*, respectively, which send exactly identical signals, and working and protection receivers (RX-W, RX-P) 2*d*, 2*e*, respectively, which receive exactly identical signals.

The working transmitter 1*b* of terminal station 1 is connected to the working receiver 2*d* of the terminal station 2 via the working uplink line 3*a*, and the protection transmitter 1*c* of terminal station 1 is connected to the protection receiver 2*e* of the terminal station 2 via the protection uplink line 4*a*. Similarly, the working transmitter 2*b* of terminal station 2 is connected to the working receiver 1*d* of the terminal station 1 via the working downlink line 3*b*, and the protection transmitter 2*c* of terminal station 2 is connected to the protection receiver 1*e* of the terminal station 1 via the protection downlink line 4*b*.

More specifically, in the system shown in FIG. 14, the terminal stations and transmission lines are both duplexed for redundancy so that when a fault develops in the working uplink line 3*a*, the system switches to the protection uplink line 4*a*. When a fault develops in the working downlink line 3*b*, the system switches to the protection downlink line 4*b*. For example, if the uplink line 3*a* develops a fault at the "x" mark and signal failure or signal degradation occurs, then the terminal station (station B) 2 detects SF or SD and sends the K1 byte (switching request) to the terminal station (station A) 1 via the protection line 4*b*. On the basis of the K1 byte which it has received, the station A performs bridging control, sends identical signals to both the working line 3*a* and protection line 4*a* and transmits the K2 byte (switching response), which is in response to the received K1 byte, to the opposing station (station B). Upon receiving the K2 byte, station B switches the line from the working line 3*a* to the protection line 4*a* by switching control. Thus, when an alarm is detected on a working or protection line, a changeover is made from the faulty line to the normal line.

When line redundancy is employed in a communication system covering a long distance and entailing a high transmission line cost (e.g., a submerged system required for international communications), providing a large number of lines and repeaters raises the cost of the communication system and is unrealistic. For this reason, use can be made of a communication system in which only the terminal equipment is provided with redundancy and not the lines.

FIG. 15 is an example of a communication system in which lines are not redundant. Components identical with those shown in FIG. 14 are designated by like reference characters. Shown in FIG. 15 are an additional unit 5 on the side of terminal A, an additional unit 6 on the side of terminal B, an uplink transmission line 7 and a downlink transmission line 8. The transmission lines 8 and 9 are not furnished with redundancy. The additional unit 5 has a switch 5*a* for selecting and sending the uplink transmission line 7 one of the signals that enter from the working and protection transmitters 1*b*, 1*c*, a hybrid circuit 5*b* for distributing a signal, which enters from the downlink transmission line 8 to the working and protection receivers 1*d*, 1*e*, and a controller 5*c* for designating the signal to be selected by the switch 5*a*. The additional unit 6 has a switch 6*a* for selecting and sending the downlink transmission line 8 one of the signals that enter from the working and protection transmitters 2*b*, 2*c*, a hybrid circuit 6*b* for distributing a signal, which enters from the uplink transmission line 7 to the working and protection receivers 2*d*, 2*e*, and a controller 6*c* for designating the signal to be selected by the switch 6*a*.

Assume that the signal of the working route is selected by the switch 5*a* in this communication and that this signal is being distributed to the working and protection receivers 2*d*, 2*e* by the hybrid circuit 6*b*. In the event that a fault develops at point x under these circumstances, the terminal station (station B) 2 detects Signal Failure SF or Signal Degradation SD in working and protection lines 3*a*', 4*a*' simultaneously. If SF or SD is sensed simultaneously in the working and protection lines, line switching is not performed according to the stipulations of the international standard since such switching would be meaningless. With the arrangement of FIG. 15, however, continuation of communication becomes possible if the line is switched from a working line 3*a* to a protection line 4*a*. This means that with a communication system not having line redundancy, it is necessary to arrange it so that communication can be continued by line switching even in a case where SF or SD is sensed simultaneously in the working and protection lines.

Progress has recently been made in communication techniques employing ultra-high-speed bit rates, communication techniques (optical amplification, code correction, etc.) using relay span extension means and optical wavelength multiplexed communication techniques, and various devices have been developed on the basis of these techniques. Such devices are placed between an SDH unit and a transmission line in an effort to reduce communication costs even if only marginally. However, there are instances where not all transmission line alarms can be detected in these devices, in which case it is necessary to deal with this by performing detection on the side of the SDH unit.

The communication system shown in FIG. 16 has been proposed to meet this requirement. This communication system has two 2.5-Gbps SDH units (SDH MUX A, SDH MUX C) 11, 12 and a 5-Gbps higher level unit (SLTE-A) 13 provided on the side of station A, and two 2.5-Gbps SDH units (SDH MUX B, SDH MUX D) 14, 15 and a 5-Gbps higher level unit (SLTE-B) 16 provided on the side of station B. The higher level units 13 and 16 are connected by uplink and downlink transmission lines 17, 18. The higher level unit 13 multiplexes the 2.5-Gbps signals from the SDH units (SDH MUX) 11, 12 to obtain a 5-Gbps signal, sends this signal to the transmission line 17, branches a 5-Gbps multiplexed signal from the transmission line 18 to the working and protection routes, demultiplexes each of these branched signals to a 2.5-Gbps signal and inputs the 2.5-Gbps signals to the SDH units (SDH MUX) 11, 12. The higher level unit 16 multiplexes the 2.5-Gbps signals from the SDH units (SDH MUX) 14, 15 to obtain a 5-Gbps signal, sends this signal to the transmission line 18, distributes a 5-Gbps multiplexed signal from the transmission line 17 to the working and protection routes, demultiplexes each of these signals to a 2.5-Gbps signal and inputs the resulting signals to the SDH units (SDH MUX) 14, 15.

The SDH units 11, 12 and 14, 15 have identical structures and each has the components indicated below. Specifically, each SDH unit (SDH MUX) includes:

(1) a working transmitter (WTX) 21;

(2) a working receiver (WRX) 22;

(3) a protection transmitter (PTX) 23;

(4) a protection receiver (PRX) 24;

(5) a multiplexer (MUX) 25 for multiplexing signals that enter from in lines #1~#11 and distributing the multiplexed signal to the working/protection transmitters 21, 23;

(6) a demultiplexer (DMUX) 26 for demultiplexing one of the multiplexed signals that enter from the working/protection receivers 22, 24;

(7) an alarm detector (ALM) 27 for detecting an alarm in the opposing station sent from the opposing station and outputting a line switching request;

(8) a fault detector (ALM) 28 for detecting signal failure SF or signal degradation SD and designating transmission of an opposing station alarm; and (9) a controller (CONT) 29 for sending an opposing station alarm in response to an opposing station alarm transmission trigger.

It should be noted that not all of the above-mentioned components are shown in the SDH units 11, 12 and 14, 15; only those components necessary for descriptive purposes are illustrated.

The higher level units (SDH MUX) 13, 16 have identical structures and each has the components indicated below. For example, the higher level unit (SDH MUX) 13 includes:

(1) a working multiplexer/demultiplexer (WMLDM) 31 which multiplexes 2.5-Gbps signals from the working transmitters 21 of the SDH (SDH MUX) units 11, 12 to obtain a 5-Gbps signal, sends this signal to the transmission line 17 via a switch, demultiplexes a 5-Gbps multiplexed signal that enters from the transmission line 18 via a hybrid circuit to 2.5-Gbps signals and inputs these signals to the working receivers 22 of the SDH units (SDH MUX) 11, 12;

(2) a protection multiplexer/demultiplexer (PMLDM) 32 which multiplexes 2.5-Gbps signals from the protection transmitters 23 of the SDH (SDH MUX) units 11, 12 to obtain a 5-Gbps signal, sends this signal to the transmission line 17 via a switch, demultiplexes a 5-Gbps multiplexed signal that enters from the transmission line 18 via a hybrid circuit to 2.5-Gbps signals and inputs these signals to the protection receivers 24 of the SDH units (SDH MUX) 11, 12;

(3) a switch (SW) 33 for selecting, and sending to the transmission line 17, one of the multiplexed signals that enters from the working multiplexer/demultiplexer (WMLDM) 31 and protection multiplexer/demultiplexer (PMLDM) 32;

(4) a hybrid circuit (HYB) 34 for distributing the 5-Gbps multiplexed signal that enters from the transmission line 18 to the working and protection multiplexer/demultiplexers 31, 32; and (5) a switch controller (SW CONT) 35 for controlling the switch 33, in response to a line switching request specified by the alarm detector (DET) 27, to send a working or protection signal to the transmission line 17.

It should be noted that not all of the above-mentioned components are shown in the higher level units 13, 16; only those components necessary for descriptive purposes are illustrated.

Described next will be a line switching procedure in a case where a line failure occurs at point x when a working signal is being transmitted in the uplink direction via the switch 33 and the transmission line 17 along the path indicated by the dashed line and, similarly, when a working signal is being transmitted in the downlink direction via the switch 33 and the transmission line 18 along the path indicated by the dot-and-dash line. In this case, (a) the higher level unit (SLTE MUX A) 13 implements switching, (b) the SDH unit (SDH MUX B) detects the transmission line alarm and transmits the opposing station information, and (c) the SDH unit (SDH MUX A) 11 detects the alarm (opposing station alarm) from the opposing station and outputs the line switching request.

(1) If a failure occurs at the location indicated at x, the signal on the line indicated by the dashed line is lost (SF) or degraded (SD).

(2) As a result, the transmission line alarm (SF, SD) is detected simultaneously by the working and protection receivers 22, 24 in the SDH unit (SDH MUX B) 14.

(3) In response to detection of the alarm (signal failure SF or signal degradation SD) simultaneously in both the working and protection routes, the fault detector (ALM) 28 generates the opposing station alarm transmission trigger. In the event that the alarm is detected in only one route, the opposing station alarm transmission trigger is not generated.

For example, if a failure occurs at point b between the multiplexer/demultiplexer 31 of the higher level 16 and the working receiver 22 of the SDH unit 14, the fault detector (ALM) 28 detects an alarm (signal failure SF or signal degradation SD) solely in the working route. In such case the fault detector (ALM) 28 so notifies the controller 29. As a result, the controller 29 controls a demultiplexer (not shown) so that the demultiplexer demultiplexes the signal from the protection receiver 24 instead of the signal from the working receiver 22 and sends the demultiplexed signals to the prescribed lines #1~#n.

(4) Upon receiving the opposing station alarm transmission trigger, the controller (CONT) 29 transmits the opposing station alarm to the SDH unit 11 along the path of the dot-and-dash line using the K2 byte of the overhead OHB.

(5) The working and protection receivers 22, 24 of the SDH unit 11 detect the opposing station alarm sent from the SDH unit 14 and notify the alarm detector (DET) 27.

(6) In response to detection of the opposing station alarm in either the working or protection route, the alarm detector (DET) 27 issues a switching request to the higher level unit 13.

(7) Upon receiving the switching request, the higher level unit 13 instructs the switch 33 to switch lines. In response to this indication to switch, the switch 33 selects the signal from the protection multiplexer/demultiplexer 32 instead of the signal from the working multiplexer/demultiplexer 31 and sends the selected signal to the transmission line 17. As the result of these operations, communication is allowed to continue.

Thus, with the arrangement shown in FIG. 16, line switching can be controlled even in a case where an alarm (signal failure SF or signal degradation SD) is detected simultaneously in both the working and protection routes of a communication system not having line redundancy.

However, a problem which arises is that the prior-art SDH unit, in contravention of the stipulation of the international standard, performs line switching in a case where an alarm is detected in working and protection routes simultaneously.

Further, when a switching request is issued, the prior art is such that switching is implemented in toggled fashion; whether the switching request is from the working side to the protection side or from the protection side to the working side cannot be determined. Consequently, if switching occurs frequently, a problem which arises in the prior art is confusion and an inability to perform switching correctly.

In an effort to solve these problems, the insertion of an alarm on the side of the opposing station is canceled after the completion of a switching operation, guard time is provided for the period of time required for the canceled signal to return to the station that issued it, and completion of switching is verified. However, communication is interrupted for the duration of switching verification.

Further, line switching in the event of failures in the transmission lines 17 and 18 is meaningless and unnecessary. Nevertheless, needless line switching is performed in such case according to the prior art.

SUMMARY OF THE INVENTION

Accordingly, an object of the present invention is to construct and standardize an SDH unit (a multiplexer serving as a lower order unit) in conformity with the stipulation of the international standard, and to positively detect faults that require switching, thereby improving system reliability.

Another object of the present invention is to make it possible to determine whether a switching request is from the working side to the protection side or from the protection side to the working side.

A further object of the present invention is to avoid unnecessary line switching in a case where transmission line failure has occurred.

According to the present invention, the foregoing objects are attained by providing a method of switching between redundant routes of a communication system provided with two terminal stations each having a first apparatus for sending working/protection main signals toward the opposing station and receiving working/protection main signals from the opposing station, and a second apparatus for selecting, and sending to the opposing station, one of the working/protection main signals output from the first apparatus toward the opposing station, and for branching a main signal, which has been sent from the opposing station, and inputting the branched signals to the first apparatus as working/protection main signals, the second apparatuses of the two terminal stations being connected by an uplink transmission line and a downlink transmission line that are devoid of redundancy, the method comprising the steps of: adopting working/protection redundancy for the first and second apparatuses constituting each terminal station; detecting line failure, which has occurred on the side of the first terminal station, by the second terminal station; multiplexing additional data, which includes a line failure alarm, onto the main signal sent from the second terminal station to the first terminal station (or inserting overhead bytes, which notify of a line failure alarm, into the main signals); and causing the first terminal station to perform line switching upon detecting the alarm from the additional data or overhead bytes.

Other features and advantages of the present invention will be apparent from the following description taken in conjunction with the accompanying drawings.

BRIEF DESCRIPTION OF THE DRAWINGS

FIG. 11 is a diagram useful in describing a K1 byte;

FIG. 12 is a diagram useful in describing a K2 byte;

DESCRIPTION OF THE PREFERRED EMBODIMENTS (A) Communication System to Which Line Switching Method of the Invention is Applicable (a) Configuration FIG. 1 is a diagram showing the configuration of a communication system to which the line switching method of the present invention is capable of applied.

Figure 1:
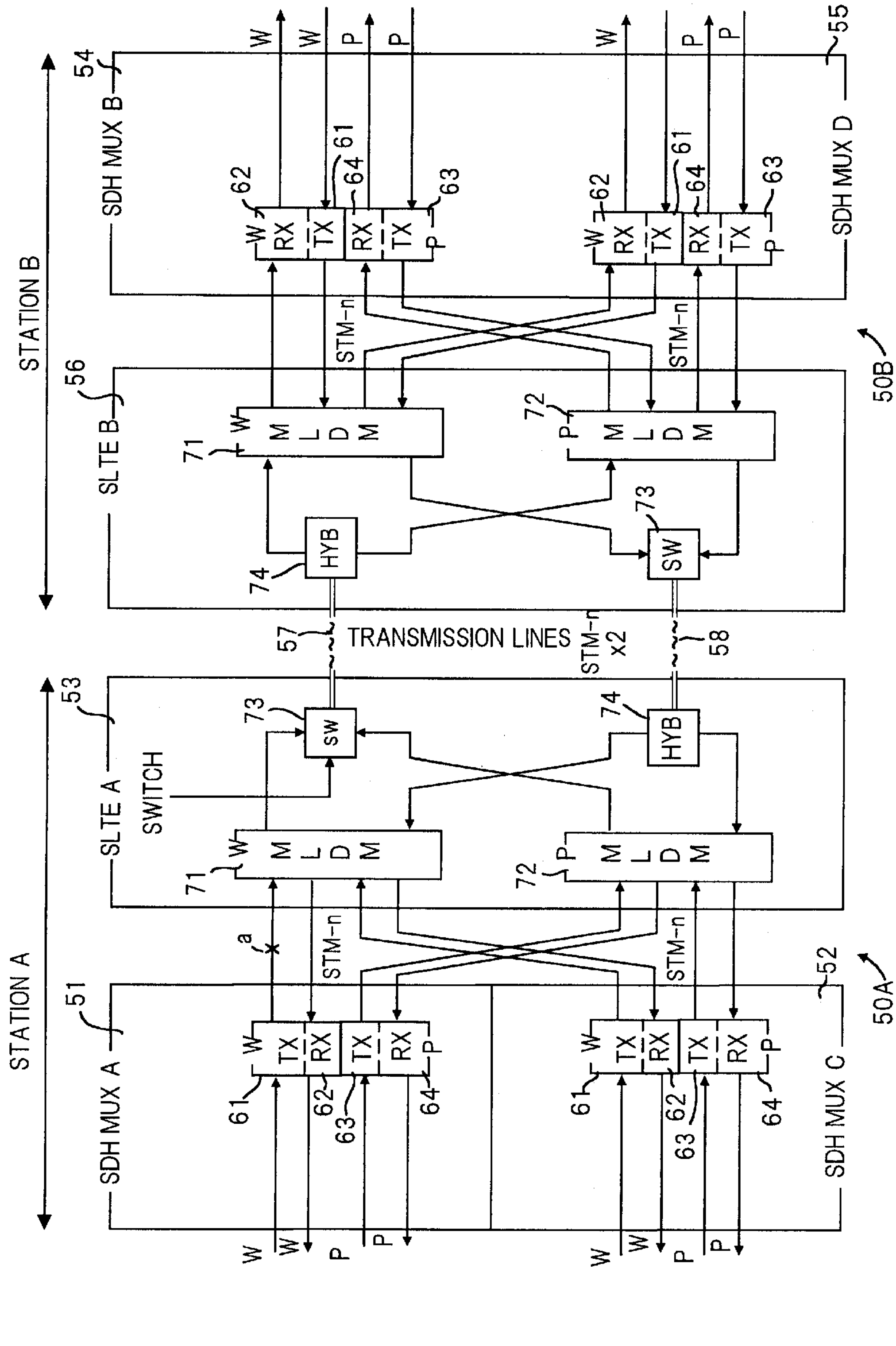
FIG. 1 is a diagram showing the configuration of a communication system to which the line switching method of the present invention is applied.

Shown in FIG. 1 are a terminal station 50A on an A side and a terminal station B on a B side. The terminal station 50A includes 2.5-Gbps SDH units (SDH MUX A, SDH MUX C) 51, 52, and a 5-Gbps higher level unit (SLTE-A) 53 for multiplexing and demultiplexing. The terminal station 50B includes 2.5-Gbps SDH units (SDH MUX B, SDH MUX D) 54, 55, and a 5-Gbps higher level unit (SLTE-B) 56 for multiplexing and demultiplexing. An uplink transmission line 57 sends a signal from the higher level unit 53 of the terminal station 50A to the higher level unit 56 of the terminal station 50B, and an downlink transmission line 58 sends a signal from the higher level unit 56 to the higher level unit 53.

The higher level unit 53 multiplexes the 2.5-Gbps signals from the SDH units (SDH MUX) 51, 52 to obtain a 5-Gbps signal, sends this signal to the transmission line 57, branches a 5-Gbps multiplexed signal from the transmission line 58, demultiplexes each of these branched signals to a 2.5-Gbps signal and inputs the 2.5-Gbps signals to the SDH units (SDH MUX) 51, 52. The higher level unit 56 multiplexes the 2.5-Gbps signals from the SDH units (SDH MUX) 54, 55 to obtain a 5-Gbps signal, sends this signal to the transmission line 58, branches a 5-Gbps multiplexed signal from the transmission line 57, demultiplexes each of these branched signals to a 2.5-Gbps signal and inputs the 2.5-Gbps signals to the SDH units (SDH MUX) 54, 55.

The SDH units 51, 52 and 54, 55 are identical in structure and each has (1) a working transmitter (WTX) 61, (2) a working receiver (WRX) 62, (3) a protection transmitter (PTX) 63 and (4) a protection receiver (PRX) 64.

The higher level unit (SDH MUX) 53 includes the following components:

(1) a working multiplexer/demultiplexer (WMLDM) 71 which multiplexes 2.5-Gbps signals from the working transmitters 61 of the SDH (SDH MUX) units 51, 52 to obtain a 5-Gbps signal, sends this 5-Gbps signal to the transmission line 57 via a switch, demultiplexes a 5-Gbps multiplexed signal that enters from the transmission line 58 via a hybrid circuit to 2.5-Gbps signals and inputs these 2.5-Gbps signals to the working receivers 62 of the SDH units (SDH MUX) 51, 52;

(2) a protection multiplexer/demultiplexer (PMLDM) 72 which multiplexes 2.5-Gbps signals from the protection transmitters 63 of the SDH (SDH MUX) units 51, 52 to obtain a 5-Gbps signal, sends this 5-Gbps signal to the transmission line 57 via a switch, demultiplexes a 5-Gbps multiplexed signal that enters from the transmission line 58 via a hybrid circuit to 2.5-Gbps signals and inputs these 2.5-Gbps signals to the protection receivers 64 of the SDH units (SDH MUX) 51, 52;

(3) a switch (SW) 73 for selecting, and sending to the transmission line 57, one of the 5-Gbps multiplexed signals that enters from the working multiplexer/demultiplexer (WMLDM) 71 and protection multiplexer/demultiplexer (PMLDM) 72; and (4) a hybrid circuit (HYB) 74 for distributing the 5-Gbps multiplexed signal that enters from the transmission line 58 to the working and protection multiplexer/demultiplexers 71, 72.

The higher level unit (SDH MUX) 56 has the same structure as that of the higher level unit 53 though the components of the latter are a mirror image of those of the former.

(b) Signal Transmission

Transmission of signals from the side of station A to the side of station B will now be described.

Working signals that have been externally applied to the SDH units 51, 52 of station A enter the working multiplexer/demultiplexer 71 of the higher level unit 53 via the working transmitters 61 of the respective SDH units 51, 52, whereby the working signals are time-division multiplexed and input to the switch 73. In parallel with this operation, protection signals that have entered the SDH units 51, 52 of station A enter the protection multiplexer/demultiplexer 72 of the higher level unit 53 via the protection transmitters 63 of the respective SDH units 51, 52, whereby the protection signals are time-division multiplexed and input to the switch 73. The switch 73 selects the signal from the working route, for example, and sends the selected signal to the transmission line 57.

The hybrid circuit 74 of the higher level unit 56 of station B branches a multiplexed signal, which has been transmitted from station A via the transmission line 57, to the working and protection multiplexer/demultiplexers 71, 72. The working multiplexer/demultiplexer 71 demultiplexes the input multiplexed signal and inputs the demultiplexed signals to the working receivers 62 of the respective SDH units 54, 55. Each of the working receivers 62 sends its input signal to the outside as a working signal. The protection multiplexer/demultiplexer 72 demultiplexes the input multiplexed signal and inputs the demultiplexed signals to the protection receivers 64 of the respective SDH units 54, 55. Each of the protection receivers 64 sends its input signal to the outside as a protection signal.

If a fault occurs at, say, point a in the working line during the transmission of these signals, the switch 73 is controlled by the line switching arrangement of the present invention, described later, in such a manner that the protection multiplexed signal instead of the working multiplexed signal is sent to the transmission line 57 to allow communication to continue.

Though the foregoing describes transmission of signals from station A to station B, operation is similar when signals are transmitted from station B to station A.

(c) Construction of Multiplexer/Demultiplexer

There are cases where the multiplexer/demultiplexers 71, 72 do and do not have a function capable of sending signals other than the main signals at the same time as the main signals.

(c-1) Arrangement with Simultaneous Transmission Function

In a case where the multiplexer/demultiplexers 71, 72 do not have a function that enables signals other than the main signals to be transmitted at the same time as the main signals, the main signals that enter from the SDH units 51, 52 are simply time-division multiplexed, and then sent to the switch 73, by the multiplexer/demultiplexers 71, 72 at a bit rate twice that of the main signals. In demultiplexing, the multiplexed signal branched from the hybrid circuit 74 is demultiplexed and the demultiplexed signals are sent to the SDH units 51, 52 at a bit rate half that of the multiplexed signal.

(c-2) Arrangement Without simultaneous Transmission Function

Figure 2A:
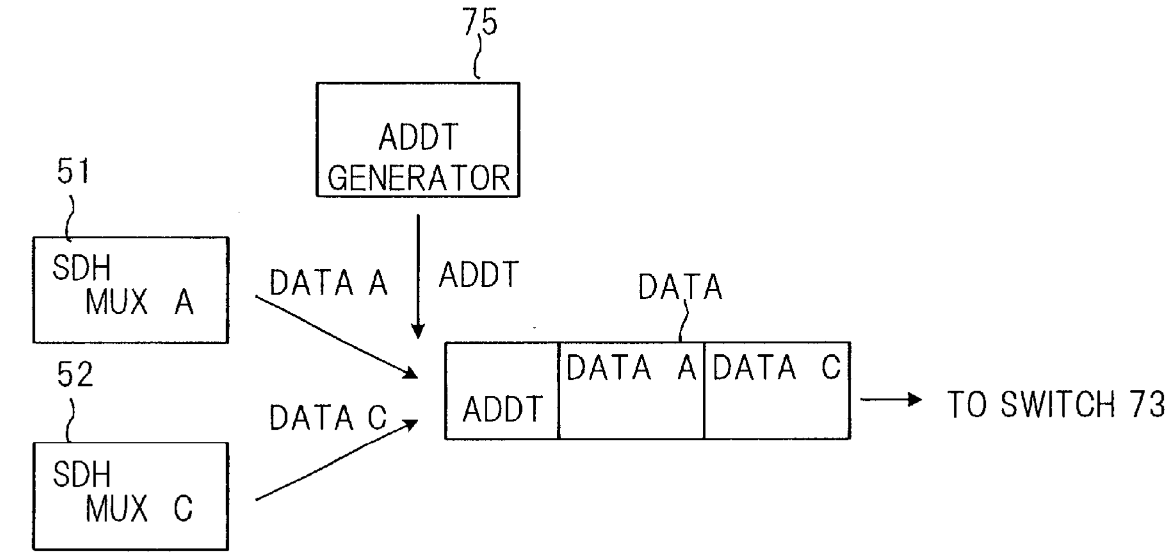
FIGS. 2A and 2B are diagrams useful in describing the multiplexer section of a multiplexer/demultiplexer.

In a case where the multiplexer/demultiplexers 71, 72 have a function that enables signals other than the main signals to be transmitted at the same time as the main signals, the multiplexer/demultiplexers time-division multiplex the main signals at a speed higher than twice the bit rate of the main signals to produce a vacant time slot, place additional data ADDT in the time slot and send the result. FIG. 2A is a diagram useful in describing the principle of such multiplexing. A vacant time slot is generated by multiplexing data items DATA A and DATA B, which have entered from the SDH units 51, 52, respectively, at a speed higher than twice the bit rate of this data, additional data ADDT, which has been generated by an additional data generator 75, is multiplexed onto this time slot and the result is sent to the switch 73.

Figure 2B:
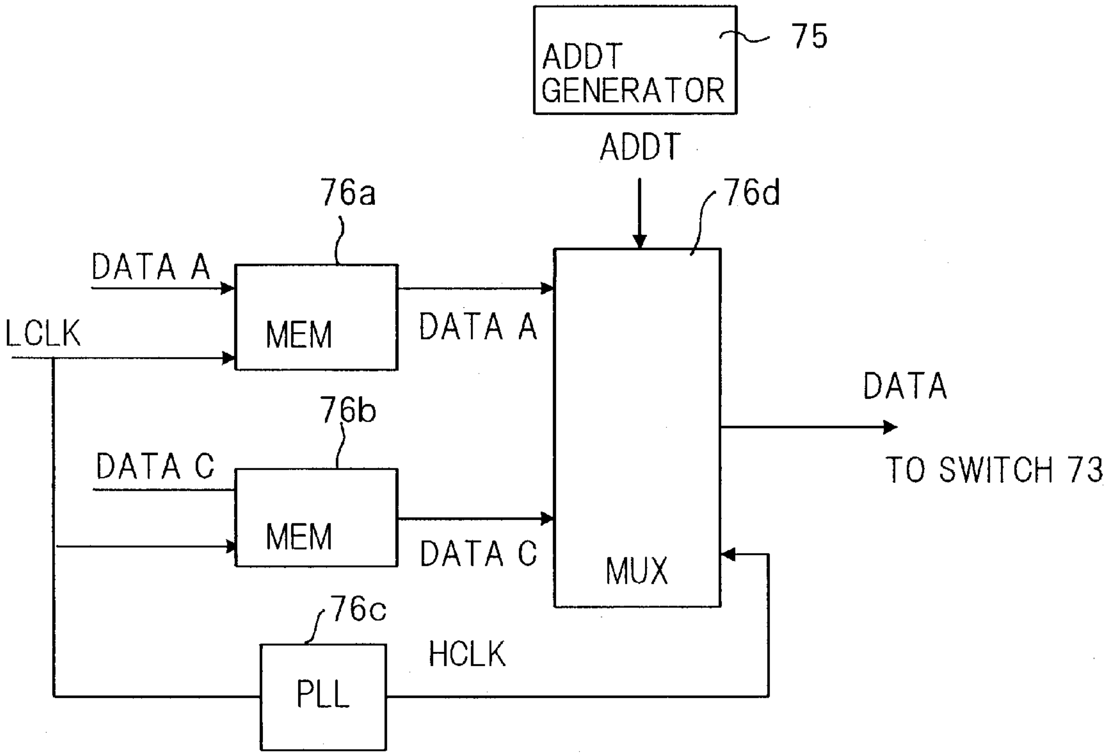

FIG. 2B is a diagram showing the construction of the multiplexer section of each multiplexer/demultiplexer. Data items DATA A and DATA C, which have been sent from the SDH units 51, 52, respectively, are stored in first and second memories 76*a*, 76*b*, respectively, in synchronization with a low-speed clock LCLK. A PLL 76*c* uses the low-speed clock to produce a high-speed clock HCLK, the speed of which is twice that of the low-speed clock LCLK, and inputs the high-speed clock HCLK to a multiplex controller 76*d*. Whenever the high-speed clock HCLK is generated, the multiplex controller 76*d* reads the data out of the memories in the order ADDT→DATA A→DATA C. That is, in synchronization with the high-speed clock HCLK, the multiplex controller 76*d* first sends the additional data ADDT, then sends one frame of the data DATA A and then sends one frame of the data DATA C, after which the multiplex controller 76 sends, by multiplexing, the additional data ADDT, the data DATA A and the data DATA C in the above-mentioned order.

Figure 3A:
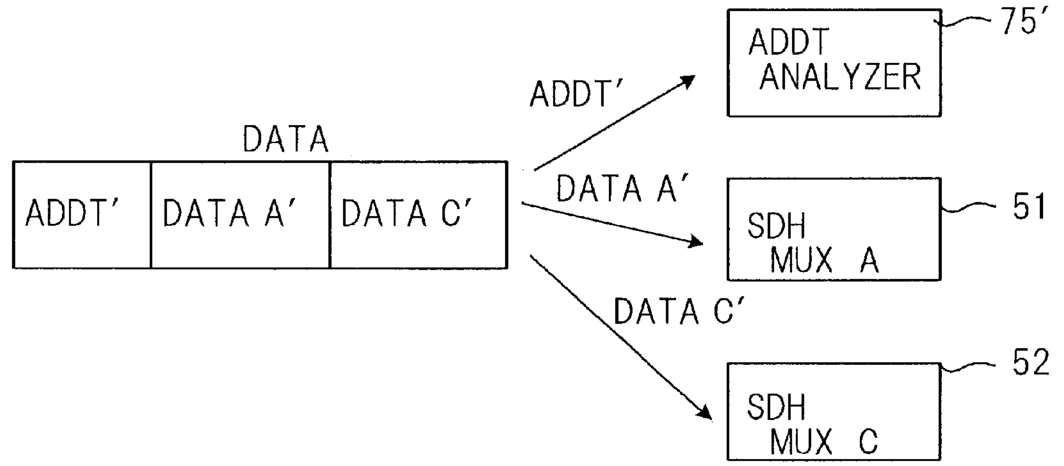
FIGS. 3A and 3B are diagrams useful in describing the demultiplexer section of the multiplexer/demultiplexer.

Further, at the time of demultiplexing, as shown in FIG. 3A, the multiplexer/demultiplexers 71, 72 demultiplex a multiplexed signal DATA, which has entered from the hybrid circuit 74, to additional data ADDT', data DATA A' and data DATA C' in synchronization with the high-speed clock HCLK, and sends these items of data to an additional data analyzer 75' and the SDH units 51, 52.

Figure 3B:
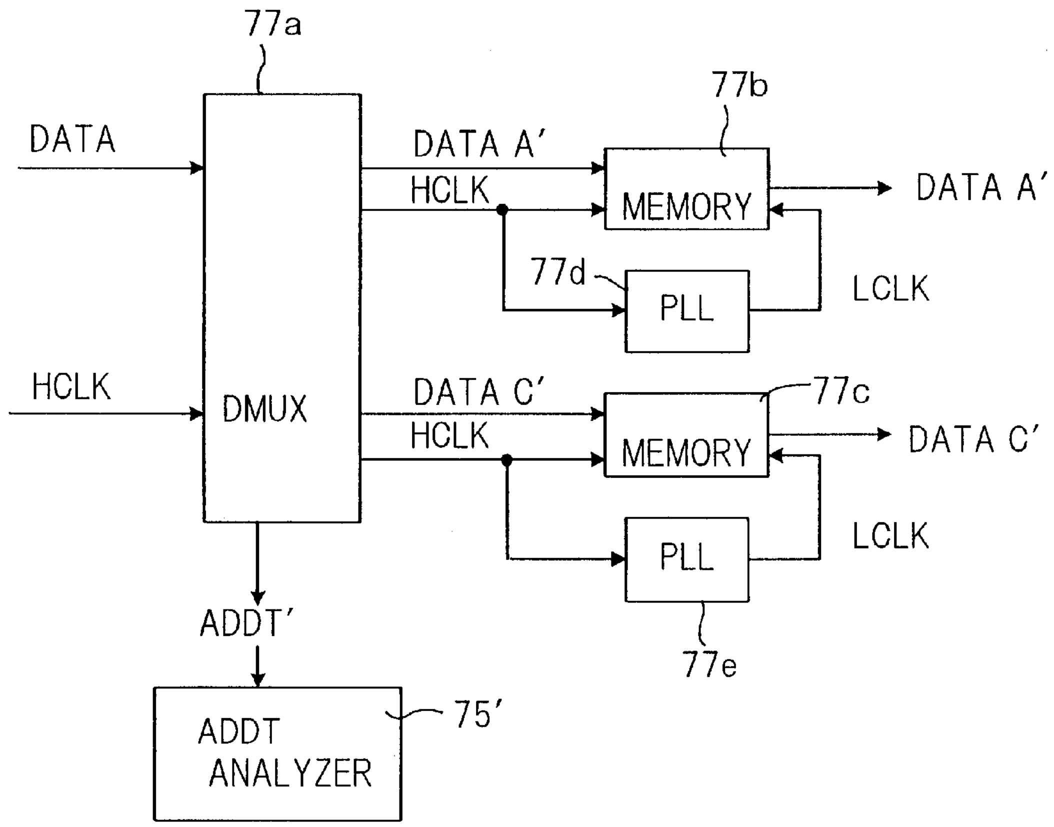

FIG. 3B is a diagram showing the construction of the demultiplexer section of each multiplexer/demultiplexer. Multiplexed data DATA that has entered from the hybrid circuit 74 is demultiplexed to additional data ADDT', data DATA A' and data DATA C' by a demultiplex controller 77*a* in synchronization with the high-speed clock HCLK. The additional data ADDT' enters an ADDT analyzer 75', and the items of data DATA A', DATA C' are written to first and second memories 77*b*, 77*c*, respectively. PLLs 77*d*, 77*e* produce the low-speed clock LCLK from the high-speed clock, and the memories 77*b* 77*d* send the data DATA A', DATA C' to the SDH units 51, 52, respectively, in synchronization with the lowspeed clock.

(B) Embodiments

Embodiments of line switching when line failure has occurred in the communication system of FIG. 1 will now be described. It should be noted that the SDH units 52, 55 have been deleted from the diagrams showing the construction of each embodiment. Further, the working multiplexer/demultiplexer 71 and the protection multiplexer/demultiplexer 72 of FIG. 1 have each been divided into multiplexer and demultiplexer sections, the multiplexer sections have been united and are illustrated as a single multiplexer section (MUX) 81, and the demultiplexer sections have been united and are illustrated as a single demultiplexer section (DMUX) 82.

(a) First Embodiment (a-1) Construction

Figure 4:
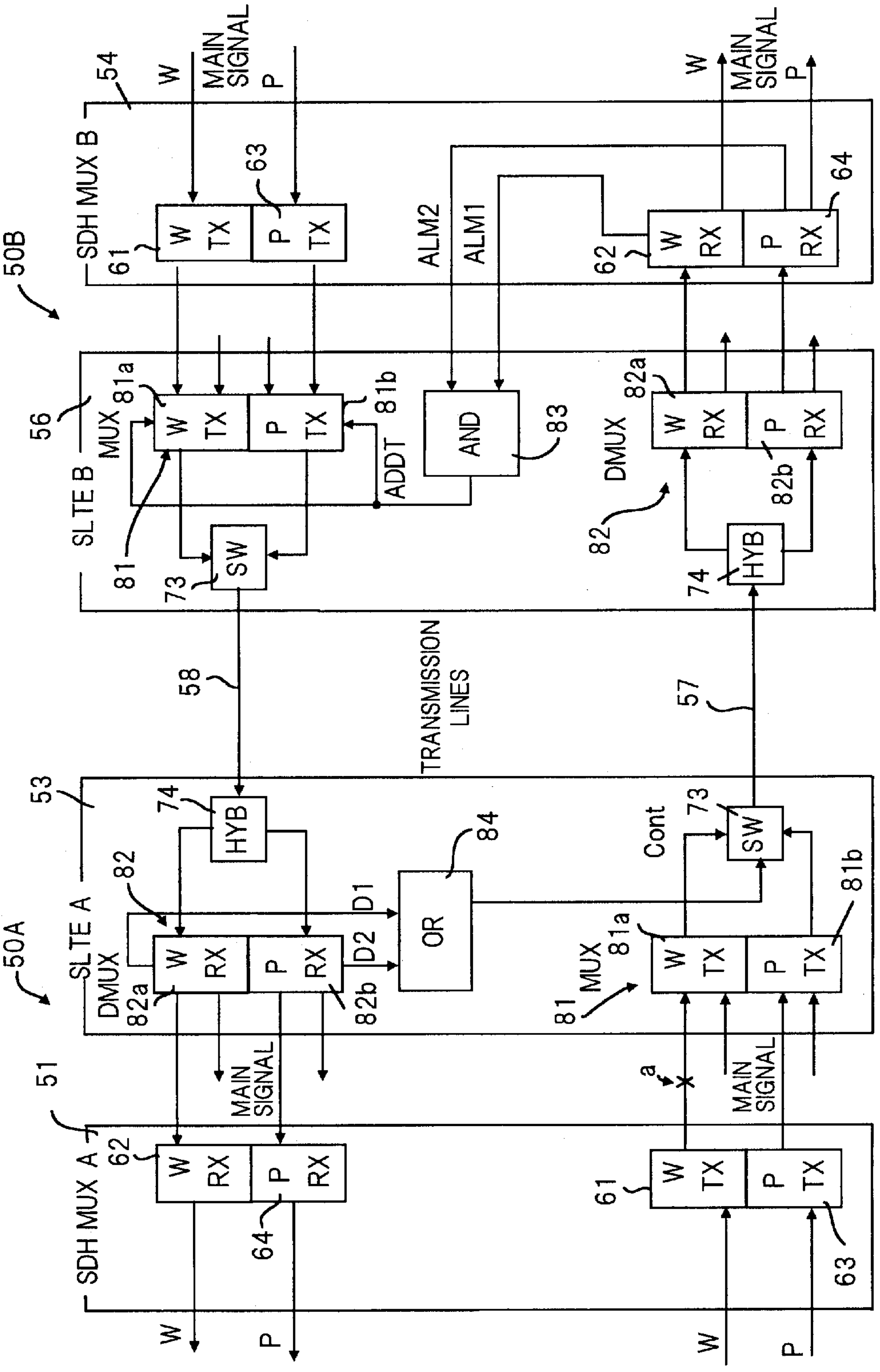
FIG. 4 is a diagram showing a line switching arrangement according to a first embodiment of the present invention.

FIG. 4 is a diagram showing the construction of a line switching arrangement according to a first embodiment of the present invention. Components identical with those shown in FIG. 1 are designated by like reference characters. Further, the multiplexer section 81 has a function for multiplexing the additional data ADDT onto the main signals and then sending the multiplexed signal, and the demultiplexer section 82 has a function for demultiplexing a multiplexed signal into main signals and the additional data ADDT and then outputting the demultiplexed signals.

The first embodiment shown in FIG. 4 includes an AND gate 83 provided in the higher level unit 56 on the side of station B for computing the AND between alarm detection signals ALM1, ALM2 of the working and protection routes. When the result of the AND operation is "1", the AND gate 83 inputs an opposing station alarm to the multiplexer section 81 as the additional data ADDT. The first embodiment further includes an OR gate 84 provided in the higher level unit 53 on the side of station A. The OR gate 84 performs an OR operation to determine whether the additional data ADDT of one of the working and protection multiplexed signals sent from station B contains the opposing station alarm. When the result of the OR operation is "1", the switch 73 is controlled to execute line switching.

(a-2) Line Switching Control

A working signal that has been externally applied to the SDH unit 51 of station A enters a working multiplexer 81*a* of the higher level unit 53 via the working transmitter 61, whereby the working signal is time-division multiplexed with the working signal from the SDH unit 52 (not shown). The resulting multiplexed signal is input to the switch 73. A protection signal that has entered the SDH unit 51 of station A enters a protection multiplexer 81*b* of the higher level unit 53 via the protection transmitter 63 of the respective SDH unit 51, whereby the protection signal is time-division multiplexed with the protection signal from the SDH unit 52 (not shown). The resulting multiplexed signal is input to the switch 73. The switch 73 selects the signal from the working route, for example, and sends the selected signal to the transmission line 57.

The hybrid circuit 74 of the higher level unit 56 of station B inputs a multiplexed signal, which has been transmitted from station A via the transmission line 57, to working and protection demultiplexers 82*a*, 82*b*. The working demultiplexer 82*a* demultiplexes the input multiplexed signal and inputs the demultiplexed signals to the working receivers 62 of the respective SDH units 54, 55 (the latter of which is not shown). The working receiver 62 sends this signal to the outside as the working signal. A protection demultiplexer 82*b* demultiplexes the input multiplexed signal and inputs the demultiplexed signals to the protection receivers 64 of the respective SDH units 54, 55 (the latter of which is not shown). The protection receiver 64 sends this signal to the outside as the protection signal.

Though the foregoing describes transmission of signals from station A to station B, operation is similar when signals are transmitted from station B to station A.

Under these normal transmission conditions, the working and protection receivers 62, 64 of SDH unit 54 send the higher level unit 56 the alarm detection signals ALM1, ALM2 of logical "0", which indicates the absence of an alarm (i.e., that line failure has not occurred). Since the output of the AND gate 83 in higher level unit 56 will be "0" in this case, absence of the alarms is input to the multiplexers 81*a*, 81*b*. The latter include the fact that alarms are nonexistent in the additional data ADDT that is multiplexed onto the main signals and then transmit the data toward the station A.

The demultiplexer section 82 of the higher level unit 53 in station A performs monitoring to determine whether the additional data ADDT sent from station A includes alarm signals and enters the results of monitoring into the OR gate 84. Since the output of the OR gate 84 will be "0" if the additional data ADDT does not contain alarm signals, communication continues without the line being switched.

If the working line develops a fault at point a under these conditions, the working and protection receivers 62, 64 of the SDH unit 54 of station B detect signal failure SF or line degradation SD and therefore output high-level alarm detection signals ALM1, ALM2, respectively. As a result, the logical output of the AND gate 83 rises to "1". Consequently, the AND gate 83 inputs an opposing station alarm to the working and protection multiplexers 81*a*, 81*b* as the additional data ADDT. The working and protection multiplexers 81*a*, 81*b* add the opposing station alarm onto the respective main signals and then send the results toward station A. The working and protection demultiplexers 82*a*, 82*b* of the SDH unit 53 in station A check to determine whether working and protection multiplexed signals contain the opposing station alarm. If this is the case, then the demultiplexers 82*a*, 82*b* output high-level opposing station alarm detection signals D1, D2. The OR gate 84 computes the logical sum of the signals D1, D2 indicating whether the additional data ADDT of the working and protection multiplexed signals contains the opposing station alarm. When the result of OR operation is "1", i.e., when either of the demultiplexers has received the opposing station alarm, the OR gate 84 instructs the switch 73 effect line switching. As a result, the switch 73 selects the protection multiplexed signal, which is being output by the protection multiplexer 81*b*, instead of the working multiplexed signal from the working multiplexer 81*a*, and sends the selected signal to the transmission line 57 so that communication may continue.

Thus, in accordance with the first embodiment, the higher level units 53 and 56 are allowed to perform the transmission and detection of the opposing station alarm, which are operations that have heretofore been performed by the SDH units. As a result, the SDH units can be standardized while the procedure involving the opposing station alarm is left to be executed in conformity with the international standard.

(b) Second Embodiment (b-1) Construction

Figure 5:
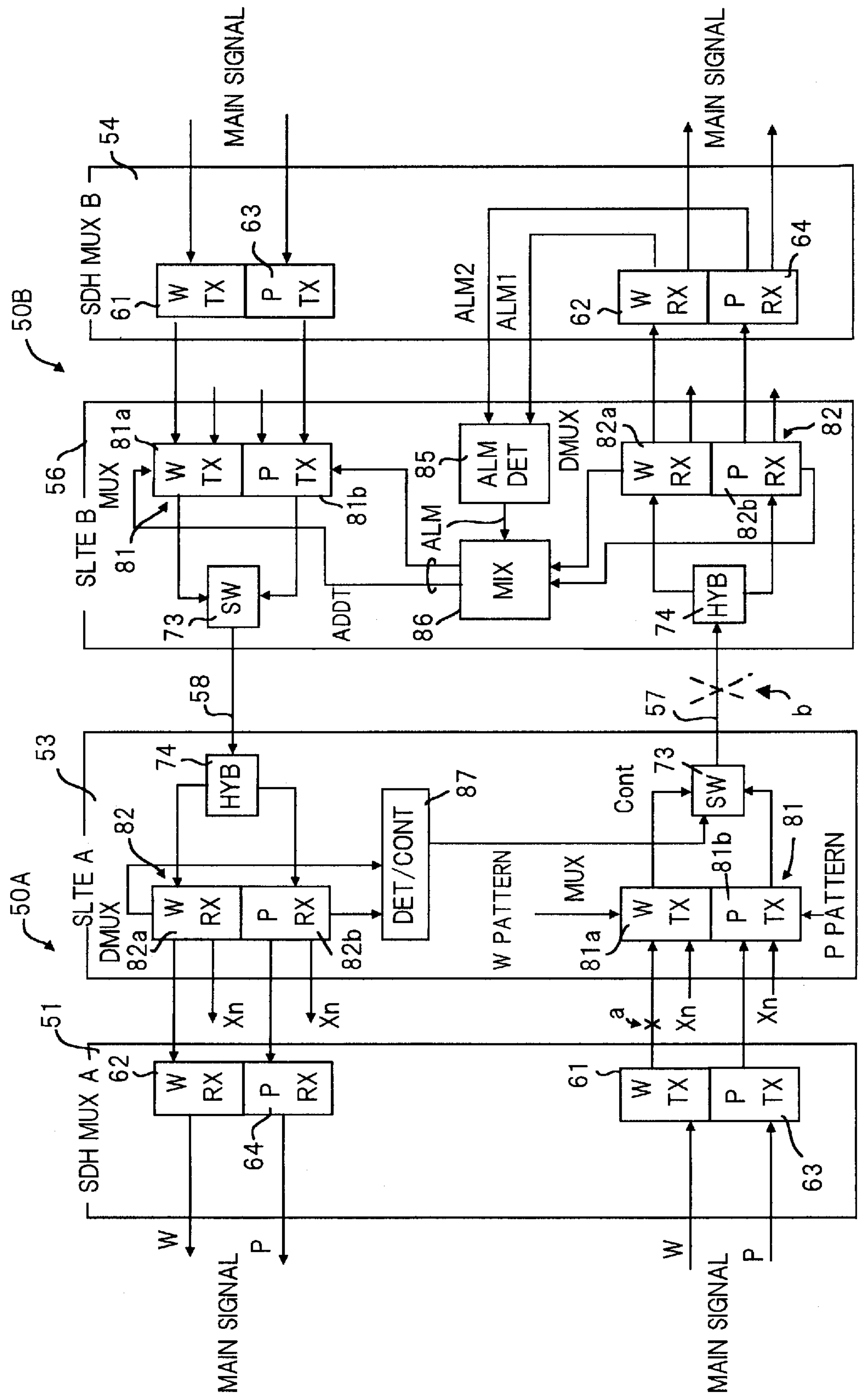
FIG. 5 is a diagram showing a line switching arrangement according to a second embodiment of the present invention.

FIG. 5 is a diagram showing the construction of a line switching arrangement according to a second embodiment of the present invention. Components identical with those shown in FIG. 1 are designated by like reference characters.

The multiplexer section 81 has a function for multiplexing the additional data ADDT onto the main signals and then sending the multiplexed signal, and the demultiplexer section 82 has a function for demultiplexing a multiplexed signal into main signals and the additional data ADDT and then outputting the demultiplexed signals. The working multiplexer 81*a* provided in the higher level unit 53 of station A multiplexes a working route identification pattern (W pattern) onto the main signals and then sends the multiplexed signal. The protection multiplexer 81*b* multiplexes a protection route identification pattern (P pattern) onto the main signals and then sends the multiplexed signal.

The working demultiplexer 82*a* provided in the higher level unit 56 of station B extracts the route identification pattern that has been multiplexed onto the working main signal and inputs the pattern to an additional data producing unit (MIX) 86, described later. The protection demultiplexer 82*b* extracts the route identification pattern that has been multiplexed onto the protection main signal and inputs the pattern to the additional data producing unit 86.

An alarm detector (ALM DET) 85, which is provided in the higher level unit 56 of station B, outputs an alarm signal ALM when the working and protection alarm detection signals ALM1, ALM2 attain the high level simultaneously. The additional data producing unit (MIX) 86 produces the additional data ADDT, which comprises (1) the opposing station alarm and (2) the route identification patterns entering from the demultiplexers 82*a*, 82*b*, and inputs the additional data ADDT to the working and protection multiplexers 81*a*, 81*b*.

An opposing station alarm detector (DET/CONT) 87, which is provided in the higher level unit 53 of station A, identifies the opposing station alarm and faulty route (working or protection route) from the additional data ADDT that has been multiplexed onto the working and protection signals sent from station B, and instructs the switch 73 to perform line switching based upon the results of identification.

(b-2) Line Switching Control

A working signal that has been externally applied to the SDH unit 51 of station A enters the working multiplexer 81*a* of the higher level unit 53 via the working transmitter 61, whereby the working signal is time-division multiplexed with the working signal from the SDH unit 52 (not shown) and the W pattern. The resulting multiplexed signal is input to the switch 73. A protection signal that has entered the SDH unit 51 of station A enters the protection multiplexer 81*b* of the higher level unit 53 via the protection transmitter 63 of the respective SDH unit 51, whereby the protection signal is time-division multiplexed with the protection signal from the SDH unit 52 (not shown) and the P pattern. The resulting multiplexed signal is input to the switch 73. The switch 73 selects the signal (onto which the W pattern has been multiplexed) from the working route, for example, and sends the selected signal to the transmission line 57.

The hybrid circuit 74 of the higher level unit 56 of station B inputs a multiplexed signal, which has been transmitted from station A via the transmission line 57, to the working and protection demultiplexers 82*a*, 82*b*. The working demultiplexer 82*a* demultiplexes the input multiplexed signal, inputs the demultiplexed W pattern to the additional data producing unit (MIX) 86 and inputs the demultiplexed main signals to the working receivers 62 of the respective SDH units 54, 55 (the latter of which is not shown). The working receiver 62 sends this signal to the outside as the working signal.

The protection demultiplexer 82*b* demultiplexes the input multiplexed signal and inputs the demultiplexed main signals to the protection receivers 64 of the respective SDH units 54, 55 (the latter of which is not shown). The protection receiver 64 sends this signal to the outside as the protection signal.

Though the foregoing describes transmission of signals from station A to station B, operation is similar when signals are transmitted from station B to station A.

Under these normal transmission conditions, the working and protection receivers 62, 64 of SDH unit 54 notify the alarm detection unit 85 of the higher level unit 56 of the absence of an alarm. As a result, the alarm detector 85 inputs the absence of an alarm to the additional data producing unit 86. The latter creates the additional data ADDT, which includes the W pattern but not the opposing station alarm, and inputs this data to the multiplexers 81*a*, 81*b*. The multiplexers 81*a*, 81*b* multiplex this additional data ADDT onto the main signals and then transmit the data toward the station A.

The demultiplexer section 82 in the higher level unit 53 of station A extracts the additional data ADDT sent from the B station and inputs this data to the opposing station alarm detector 87. Since the additional data ADDT does not contain the opposing station alarm, the opposing station alarm detector 87 does not switch lines.

If the working line develops a fault at point a under these conditions, the working and protection receivers 62, 64 of the SDH unit 54 of station B detect signal failure SF or line degradation SD and therefore output the high-level alarm detection signals ALM1, ALM2, respectively. As a result, the alarm detector 85 inputs the high-level alarm signal ALM to the additional data producing unit 86.

It should be noted that even though a fault has occurred at point a, the working multiplexer 81*a* of the higher level unit 53 is multiplexing the W pattern onto the working main signal and sending the multiplexed signal. Consequently, the working demultiplexer 82*a* of the higher level unit 56 in station B extracts the W pattern and inputs the pattern to the additional data producing unit 86.

When the alarm signal ALM attains the high level, the additional data producing unit 86 creates the additional data ADDT that includes the opposing station alarm and the W pattern and inputs the additional data ADDT to the working and protection multiplexers 81*a*, 81*b*. The latter multiplex the additional data ADDT onto the main signals and then transmit the multiplexed signal toward station A.

The opposing station alarm detector 87 identifies the opposing station alarm and the faulty route (the main route in this case) from the additional data ADDT extracted by the working and protection demultiplexers 82*a*, 82*b* and instructs the switch 73 to perform line switching based upon the results of identification.

When the line switching operation ends, the route identification pattern is changed from the W pattern to the P pattern automatically and the P pattern is sent back to the higher level unit 53 of station A via the higher level unit 56 of station B. At this time switching is performed reliably owing to verification of the presence or absence of an alarm, whereby it can be confirmed whether the alarm has been eliminated.

The foregoing relates to a case where the working line failed at point a. However, there are instances where a failure occurs at a point b along the transmission line. In such case line switching would be meaningless and therefore unnecessary. Here it should be noted that a route identification pattern will not enter the additional data producing unit 86 when the transmission line 57 fails. Accordingly, the occurrence of an alarm unaccompanied by input of a route identification pattern is judged to be a failure in the transmission line 57 and the additional data producing unit 86 does not include the opposing station alarm in the additional data ADDT. Line switching, therefore, is not carried out.

Thus, in accordance with the second embodiment, effects similar to those of the first embodiment can be obtained. Moreover, the faulty route can be identified. Further, according to the second embodiment, it can be so arranged that unnecessary line switching is not performed when a fault develops in the transmission line.

(c) Third Embodiment (c-1) Construction

Figure 6:
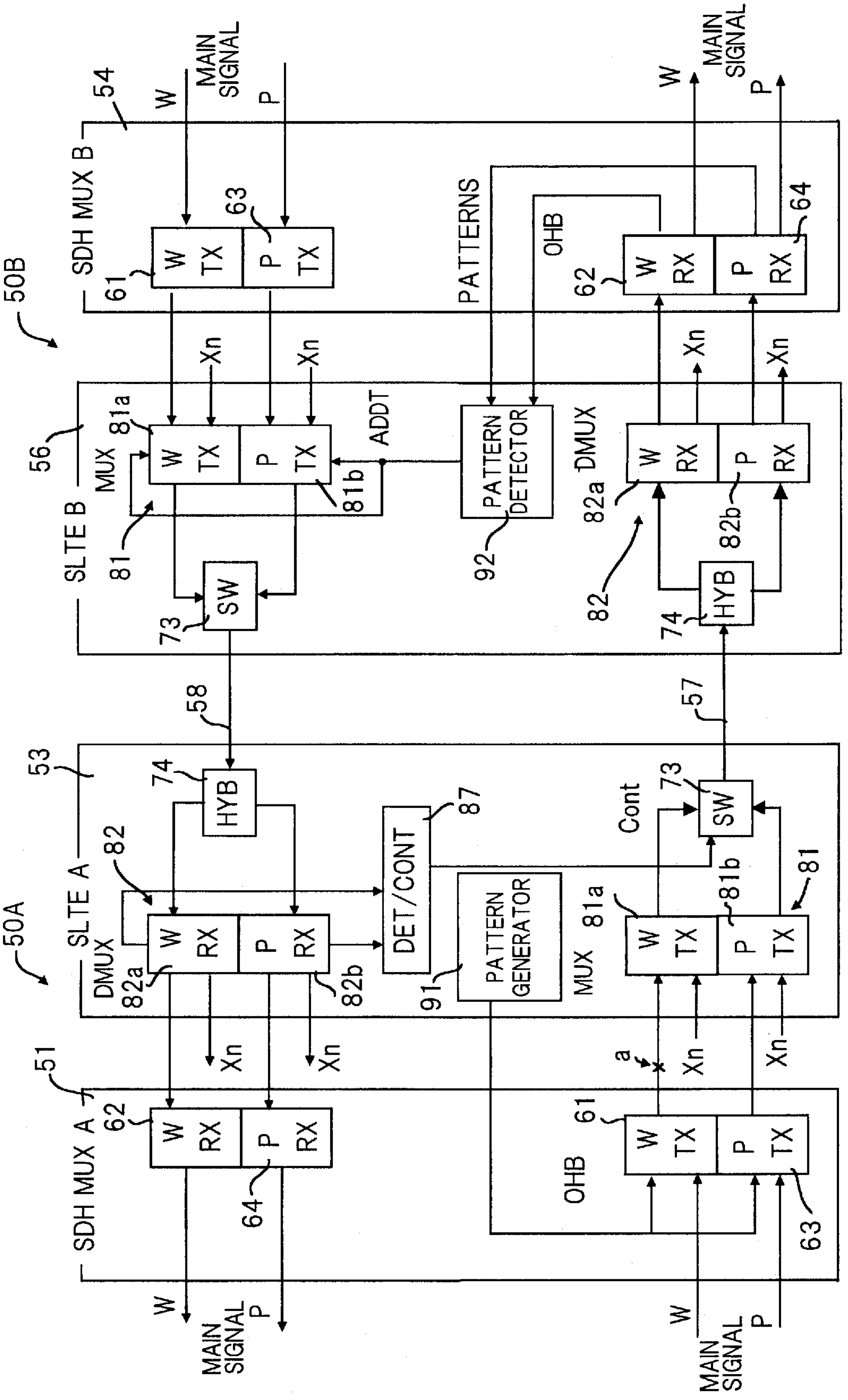
FIG. 6 is a diagram showing a line switching arrangement according to a third embodiment of the present invention.

FIG. 6 is a diagram showing the construction of a line switching arrangement according to a third embodiment of the present invention. Components identical with those shown in FIG. 1 are designated by like reference characters.

This arrangement includes the opposing station alarm detector (DET/CONT) 87 provided in the higher level unit 53 of station A for identifying the opposing station alarm from the additional data ADDT that has been multiplexed onto the working and protection signals sent from station B, and instructing the switch 73 to perform line switching based upon the results of identification.

The arrangement of FIG. 6 further includes a pattern generator 91 provided in the higher level unit 53 of station A for generating a predetermined pattern and inputting the pattern to the working and protection transmitters 61, 63 of the SDH unit 51. The transmitters 61, 63 each send the above-mentioned pattern to station B using the undefined bytes D1~D12, F1, E1, E2 among the overhead bytes OHB of the main signals.

This embodiment further includes a pattern detector (DET) 92 provided in the higher level unit 56 of station B. The working and protection receivers 62, 64 of station B identify the patterns, which have been sent by the undefined bytes D1~D12, F1, E1, E2 among the overhead bytes OHB of the main signals, and input the patterns to the pattern detector 92. The latter compares the patterns that have entered from the working and protection receivers 62, 64 with an already known pattern and determines whether the compared patterns match. If neither pattern matches the known pattern, the pattern detector 92 judges that a line failure has occurred, creates the additional data ADDT inclusive of the opposing station alarm and inputs this data to the working and protection multiplexers 81*a*, 81*b*.

(c-2) Line Switching Control

The working and protection transmitters 61, 63 of the SDH unit 51 of station A insert the pattern entering from the pattern generator 91 into the working and protection main signals using the undefined bytes of the overhead bytes OHB and input the main signals to the working and protection multiplexers 81*a*, 81*b* of the higher level unit 53. The working multiplexer 81*a* time-division multiplexes the working signals from the SDH units 51 and 52 (the latter of which is not shown) and inputs the resulting multiplexed signal to the switch 73. Further, the protection multiplexer 81*b* timedivision multiplexes the protection signals from the SDH units 51 and 52 (the latter of which is not shown) and inputs the resulting multiplexed signal to the switch 73. The switch 73 selects the signal from the working route, for example, and sends the selected signal to the transmission line 57.

The hybrid circuit 74 of the higher level unit 56 of station B inputs the multiplexed signal, which has been transmitted from station A via the transmission line 57, to the working and protection demultiplexers 82*a*, 82*b*. The working demultiplexer 82*a* demultiplexes the input multiplexed signal and inputs the demultiplexed main signals to the working receivers 62 of the respective SDH units 54, 55 (the latter of which is not shown). The working receiver 62 sends this signal to the outside as the working signal, extracts the pattern from the undefined bytes of the overhead bytes of the main signals and inputs the pattern to the pattern detector 92. The protection demultiplexer 82*b* demultiplexes the input multiplexed signal and inputs the demultiplexed main signals to the protection receivers 64 of the respective SDH units 54, 55 (the latter of which is not shown). The protection receiver 64 sends this signal to the outside as the protection signal, extracts the pattern from the undefined bytes of the overhead bytes of the main signals and inputs the pattern to the pattern detector 92.

Under these normal operating conditions, the patterns extracted by the working and protection receivers 62, 64 match the pattern generated by the pattern generator 91. Accordingly, the pattern detector 92 creates the additional data ADDT, which does not include the opposing station alarm, and inputs this data to the multiplexers 81*a*, 81*b*. The multiplexers 81*a*, 81*b* multiplex this additional data ADDT onto the main signals and then transmit the data toward the station A.

The demultiplexer section 82 in the higher level unit 53 of station A extracts the additional data ADDT sent from the B station and inputs this data to the opposing station alarm detector 87. Since the additional data ADDT does not contain the opposing station alarm, the opposing station alarm detector 87 does not switch lines.

If the working line develops a fault at point a under these conditions, the working and protection receivers 62, 64 of the SDH unit 54 of station B cannot extract the pattern generated by the pattern generator 91 and, as a consequence, the patterns output by the working and protection receivers 62, 64 will no longer match the known pattern. If this occurs, the pattern detector 92 construes this as being indicative of line failure, creates the additional data ADDT inclusive of the opposing station alarm and inputs the data to the working and protection multiplexers 81*a*, 81*b*. The latter multiplex the additional data ADDT onto the main signals and then transmit the multiplexed signal toward station A.

The opposing station alarm detector 87 identifies the opposing station alarm from the additional data ADDT extracted by the working and protection demultiplexers 82*a*, 82*b* and instructs the switch 73 to perform line switching based upon the results of identification.

When the line switching operation ends, the above-mentioned pattern is sent back to the higher level unit 53 of station A via the higher level unit 56 of station B. At this time switching is performed reliably owing to verification of the presence or absence of an alarm, whereby it can be confirmed whether the alarm has been eliminated.

Thus, in accordance with the third embodiment, effects similar to those of the first embodiment can be obtained. In addition, even if line failure cannot be definitely detected based upon signal failure SF or signal degradation SD, line failure can be detected and line switching performed promptly and reliably based upon non-matching of the compared patterns.

(d) Fourth Embodiment (d-1) Construction

Figure 7:
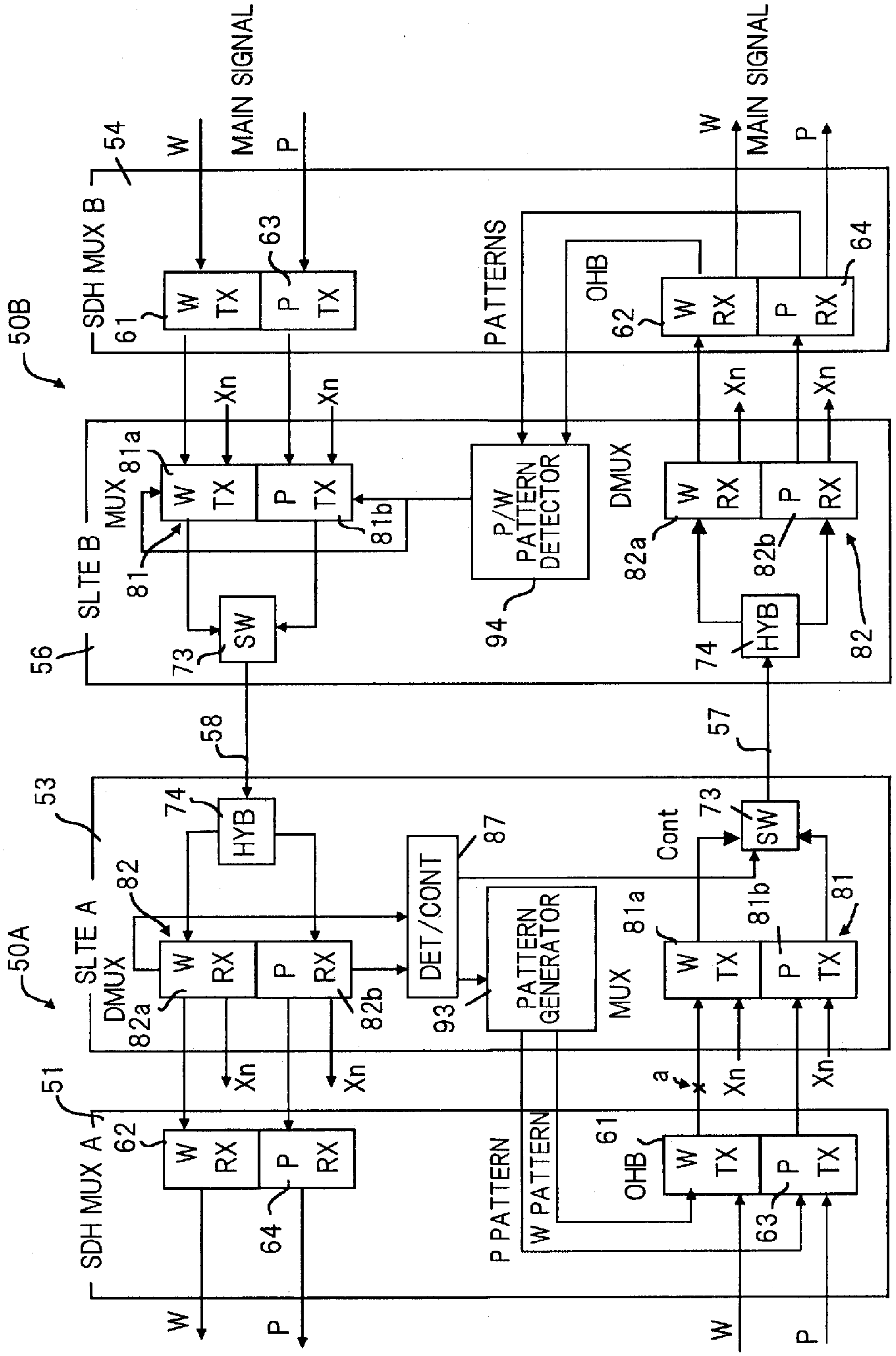
FIG. 7 is a diagram showing a line switching arrangement according to a fourth embodiment of the present invention.

FIG. 7 is a diagram showing the construction of a line switching arrangement according to a fourth embodiment of the present invention. Components identical with those shown in FIG. 1 are designated by like reference characters.

This arrangement includes the opposing station alarm detector (DET/CONT) 87 provided in the higher level unit 53 of station A for identifying the opposing station alarm from the additional data ADDT that has been multiplexed onto the working and protection signals sent from station B, and instructing the switch 73 to perform line switching based upon the results of identification.

The arrangement of FIG. 7 further includes a pattern generator 93 provided in the higher level unit 53 of station A for constantly generating W and P patterns and inputting the W and P patterns to the working and protection transmitters 61, 63, respectively, of the SDH unit 51. The working and protection transmitters 61, 63 insert the W and P patterns into the main signals using the undefined bytes D1~D12, F1, E1, E2 among the overhead bytes OHB of the main signals and send the resulting signals to station B.

This embodiment further includes a pattern detector (DET) 94 provided in the higher level unit 56 of station B. The working and protection receivers 62, 64 of station B identify the patterns, which have been sent by the undefined bytes D1~D12, F1, E1, E2 among the overhead bytes OHB of the main signals, and input the patterns to the pattern detector 92. The latter compares the patterns that have entered from the working and protection receivers 62, 64 with an already known pattern (W or P pattern) and determines whether the compared patterns match. If neither pattern matches the known pattern, the pattern detector 94 judges that a line failure has occurred, creates the additional data ADDT inclusive of the opposing station alarm and inputs this data to the working and protection multiplexers 81*a*, 81*b*.

(d-2) Line Switching Control

The working and protection transmitters 61, 63 of the SDH unit 51 of station A insert the W and P patterns entering from the pattern generator 93 into the working and protection main signals, respectively, using the undefined bytes of the overhead bytes OHB and input the main signals to the working and protection multiplexers 81*a*, 81*b* of the higher level unit 53. The working multiplexer 81*a* time-division multiplexes the working signals from the SDH units 51 and 52 (the latter of which is not shown) and inputs the resulting multiplexed signal to the switch 73. Further, the protection multiplexer 81*b* time-division multiplexes the protection signals from the SDH units 51 and 52 (the latter of which is not shown) and inputs the resulting multiplexed signal to the switch 73. The switch 73 selects the signal from the working multiplexer 81*a* (the signal in which the W pattern has been inserted), for example, and sends the selected signal to the transmission line 57.

The hybrid circuit 74 of the higher level unit 56 of station B inputs the working-route multiplexed signal, which has been transmitted from station A via the transmission line 57, to the working and protection demultiplexers 82*a*, 82*b*. The working demultiplexer 82*a* demultiplexes the input working-route multiplexed signal and inputs the demultiplexed main signals to the working receivers 62 of the respective SDH units 54, 55 (the latter of which is not shown). The working receiver 62 sends this signal to the outside as the working signal, extracts the W pattern from the undefined bytes of the overhead bytes OHB of the main signals and inputs the W pattern to the pattern detector 94.

Under these normal operating conditions, the patterns extracted by the working and protection receivers 62, 64 match the W pattern. Accordingly, the pattern detector 94 creates the additional data ADDT, which does not include the opposing station alarm, and inputs this data to the multiplexers 81*a*, 81*b*. The multiplexers 81*a*, 81*b* multiplex this additional data ADDT onto the main signals and then transmit the data toward the station A.

The working and protection demultiplexers 82*a*, 82*b* of the higher level unit 53 in station A extract the additional data ADDT sent from the B station and input this data to the opposing station alarm detector 87. Since the additional data ADDT does not contain the opposing station alarm, the opposing station alarm detector 87 does not switch lines.

If the working line develops a fault at point a under these conditions, the working and protection receivers 62, 64 can no longer extract the W pattern. If this occurs, the pattern detector 94 construes this as being indicative of line failure, creates the additional data ADDT inclusive of the opposing station alarm and inputs the data to the working and protection multiplexers 81*a*, 81*b*. The latter multiplex the additional data ADDT onto the main signals and then transmit the multiplexed signal toward station A.

The opposing station alarm detector 87 identifies the opposing station alarm from the additional data ADDT extracted by the working and protection demultiplexers 82*a*, 82*b* and instructs the switch 73 to perform line switching from the working to the protection line based upon the results of identification.

When the line switching operation ends, the route identification pattern is changed from the W pattern to the P pattern and the P pattern is sent back to the higher level unit 53 of station A via the higher level unit 56 of station B. At this time switching is performed reliably owing to verification of the presence or absence of an alarm, whereby it can be confirmed whether the alarm has been eliminated.

Thus, in accordance with the third embodiment, effects similar to those of the first embodiment can be obtained. Moreover, the faulty route can be identified.

Further, according to the fourth embodiment, even if line failure cannot be definitely detected based upon signal failure SF or signal degradation SD, line failure can be detected and line switching performed promptly and reliably based upon non-matching of the compared patterns.

(e) Fifth Embodiment (e-1) Construction

Figure 8:
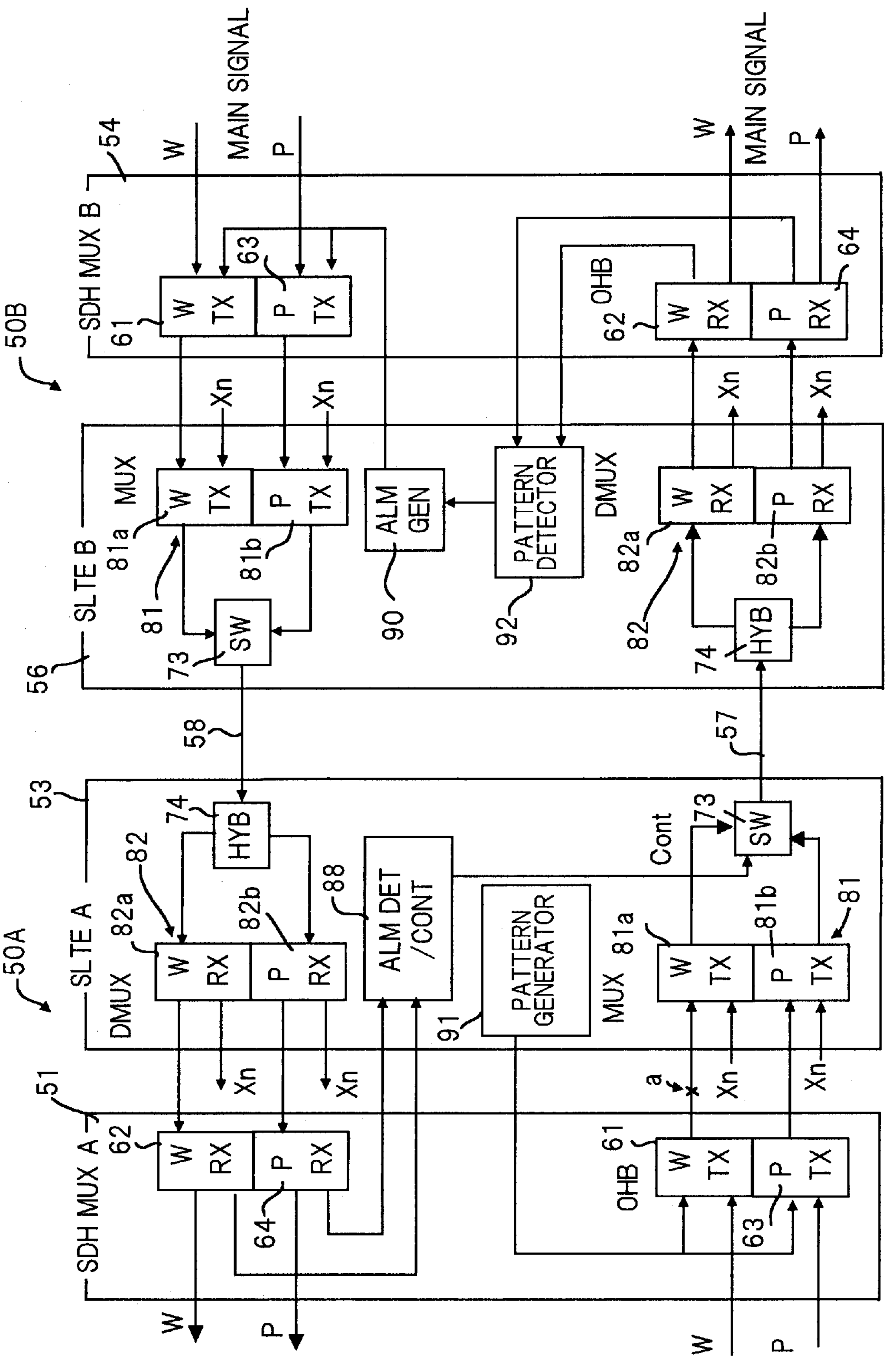
FIG. 8 is a diagram showing a line switching arrangement according to a fifth embodiment of the present invention.

FIG. 8 is a diagram showing the construction of a line switching arrangement according to a fifth embodiment of the present invention. Components identical with those shown in FIG. 1 are designated by like reference characters.

This arrangement includes an opposing station alarm detector (DET/CONT) 88 provided in the higher level unit 53 of station A for determining whether the opposing station alarm is being sent by the K1 byte of the overhead bytes OHB in the working and protection signals sent from station B, and instructing the switch 73 to perform line switching based upon the results of the determination.

This arrangement further includes an alarm signal generator (ALM GEN) 90 for sending an alarm signal to the working and protection transmitters 61, 63 when line failure has been detected. Upon receiving the alarm signal applied thereto, the transmitters 61, 63 notify station A of the occurrence of failure using the K1 byte of the overhead bytes OHB in the working and protection signals.

The pattern generator 91 is provided in the higher level unit 53 of station A, generates a predetermined pattern and inputs the pattern to the working and protection transmitters 61, 63 of the SDH unit 51. The transmitters 61, 63 each send the above-mentioned pattern to station B using the undefined bytes D1~D12, F1, E1, E2 among the overhead bytes OHB of the main signals.

The pattern detector 92 is provided in the higher level unit 56 of station B. The working and protection receivers 62, 64 of station B identify the patterns, which have been sent by the undefined bytes D1~D12, F1, E1, E2 among the overhead bytes OHB of the main signals, and input the patterns to the pattern detector 92. The latter compares the patterns that have entered from the working and protection receivers 62, 64 with an already known pattern and determines whether the compared patterns match. If neither pattern matches the known pattern, the pattern detector 92 judges that a line failure has occurred and enters a signal indicative of this fact into the alarm signal generator (ALM GEN) 90.

(e-2) Line Switching Control

The working and protection transmitters 61, 63 of the SDH unit 51 of station A insert the fixed pattern entering from the pattern generator 91 into the working and protection main signals using the undefined bytes of the overhead bytes OHB and input the main signals to the working and protection multiplexers 81*a*, 81*b* of the higher level unit 53. The working multiplexer 81*a* time-division multiplexes the working signals from the SDH units 51 and 52 (the latter of which is not shown) and inputs the resulting multiplexed signal to the switch 73. Further, the protection multiplexer 81*b* time-division multiplexes the protection signals from the SDH units 51 and 52 (the latter of which is not shown) and inputs the resulting multiplexed signal to the switch 73. The switch 73 selects the signal from the working route, for example, and sends the selected signal to the transmission line 57.

The hybrid circuit 74 of the higher level unit 56 of station B inputs the multiplexed signal, which has been transmitted from station A via the transmission line 57, to the working and protection demultiplexers 82*a*, 82*b*. The working demultiplexer 82*a* demultiplexes the input multiplexed signal and inputs the demultiplexed main signals to the working receivers 62 of the respective SDH units 54, 55 (the latter of which is not shown). The working receiver 62 sends this signal to the outside as the working signal, extracts the pattern from the undefined bytes of the overhead bytes OHB of the main signals and inputs the pattern to the pattern detector 92. The protection demultiplexer 82*b* demultiplexes the input multiplexed signal and inputs the demultiplexed main signals to the protection receivers 64 of the respective SDH units 54, 55 (the latter of which is not shown). The protection receiver 64 sends this signal to the outside as the protection signal, extracts the pattern from the undefined bytes of the overhead bytes of the main signals and inputs the pattern to the pattern detector 92.

Under these normal operating conditions, the patterns extracted by the working and protection receivers 62, 64 match the pattern generated by the pattern generator 91. Accordingly, the pattern detector 92 inputs a signal indicative of pattern matching to the alarm signal generator 90 and the alarm signal generator 90 recognizes the fact that a line failure has not occurred. As a result, notification of line failure is not indicated by the overhead bytes and, hence, the opposing station alarm detector 88 does not switch lines.

If the working line develops a fault at point a under these conditions, the patterns output by the working and protection receivers 62, 64 will no longer match the known pattern owing to signal failure or signal degradation. As a result, the pattern detector 92 inputs a signal indicative of non-matching to the alarm signal generator 90. In response, the alarm signal generator 90 notifies the working and protection transmitters 61, 63 of the SDH unit 54 of the occurrence of line failure. In response to such notification, the working and protection transmitters 61, 63 transmit the opposing station alarm by the overhead bytes OHB (the K1 byte).

The working and protection receivers 62, 64 of station A each extract the K1 byte of the overhead bytes OHB and input the K1 byte to the opposing station alarm detector 88. In response to the K1 byte of the overhead bytes OHB, the opposing station alarm detector 88 detects the fact that notification has been given of line failure and instructs the switch 73 to switch lines.

Thus, in accordance with the fifth embodiment, effects similar to those of the first embodiment can be obtained. Moreover, even if a terminal station does not possess a function for multiplexing the additional data ADDT onto main signals and then transmitting the same, a pattern or opposing station alarm can be sent to the terminal station of the other party by the overhead bytes OHB so that line switching can be carried out.

(f) Sixth Embodiment (f-1) Construction

Figure 9:
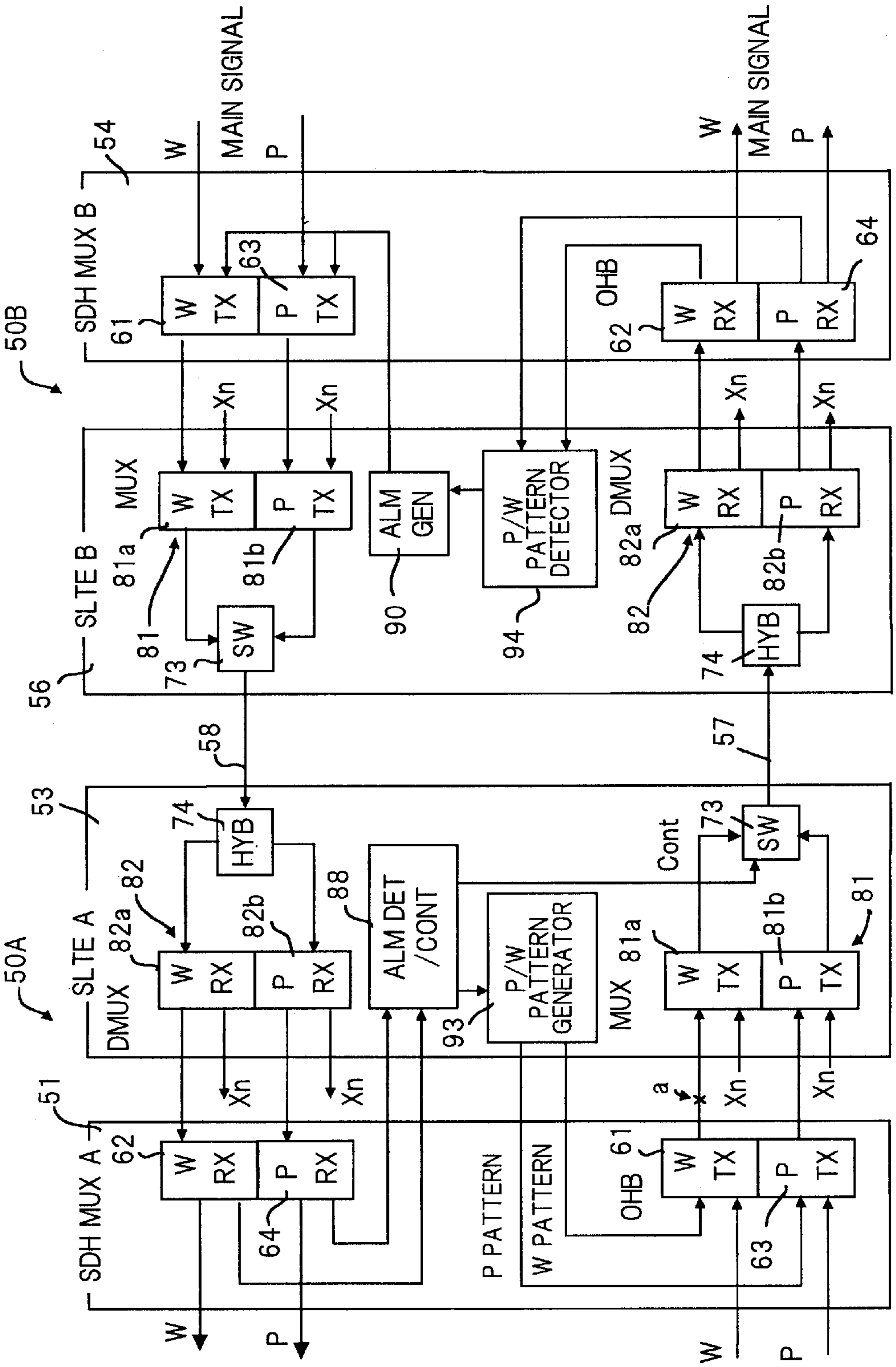
FIG. 9 is a diagram showing a line switching arrangement according to a sixth embodiment of the present invention.
Figure 10A:
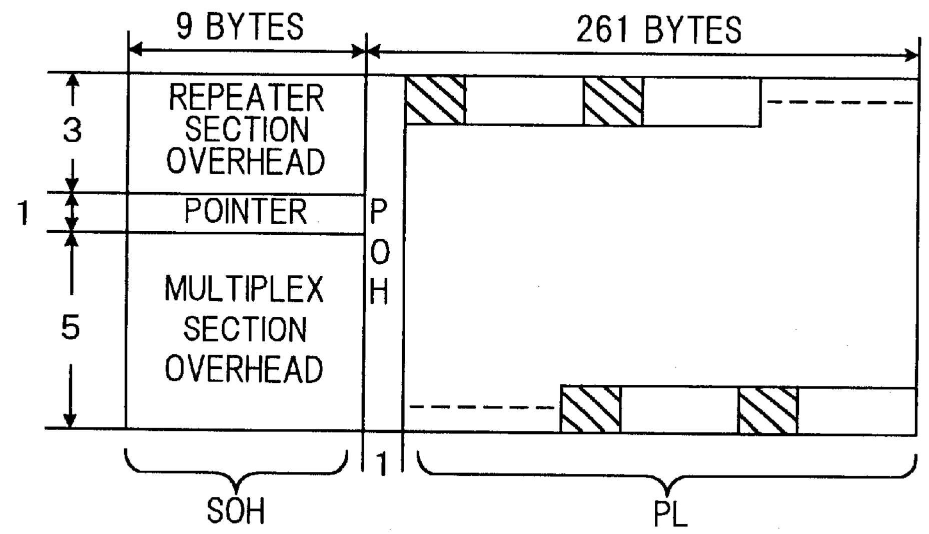
FIGS. 10A and 10B are diagrams useful in describing the format of a SONET OC-3 frame.
Figure 10B:
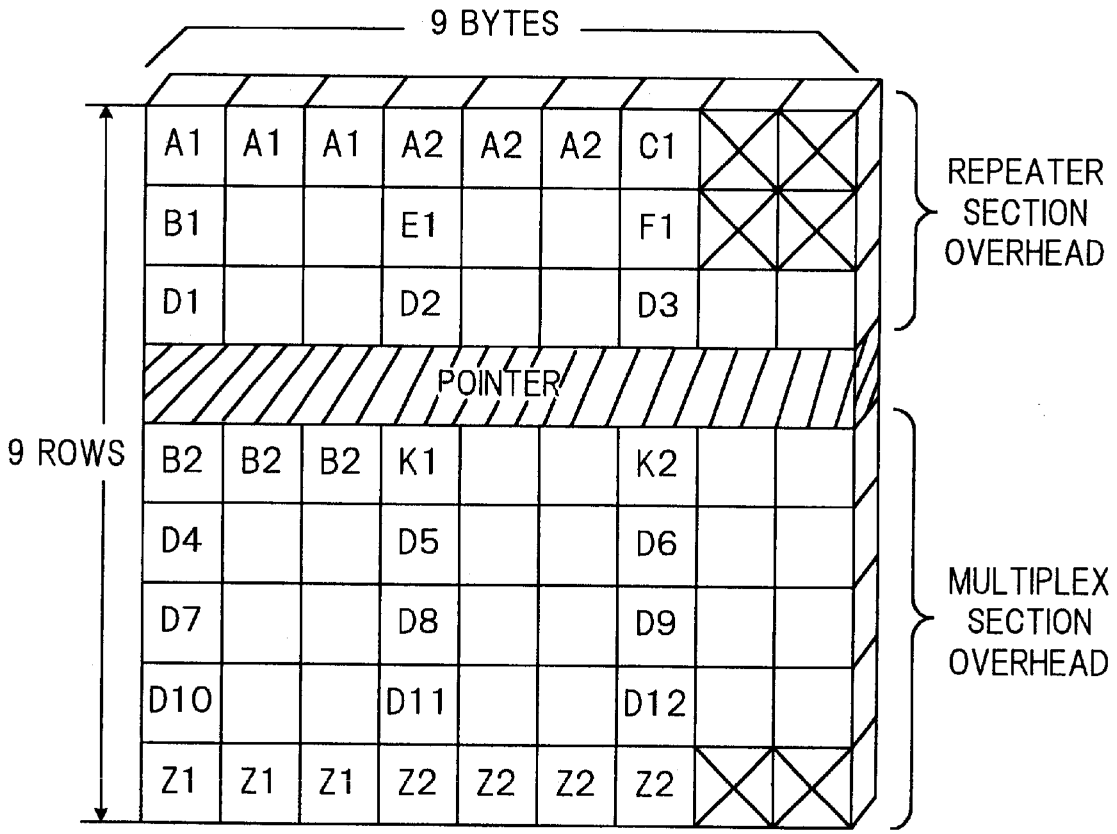
Figure 13A:
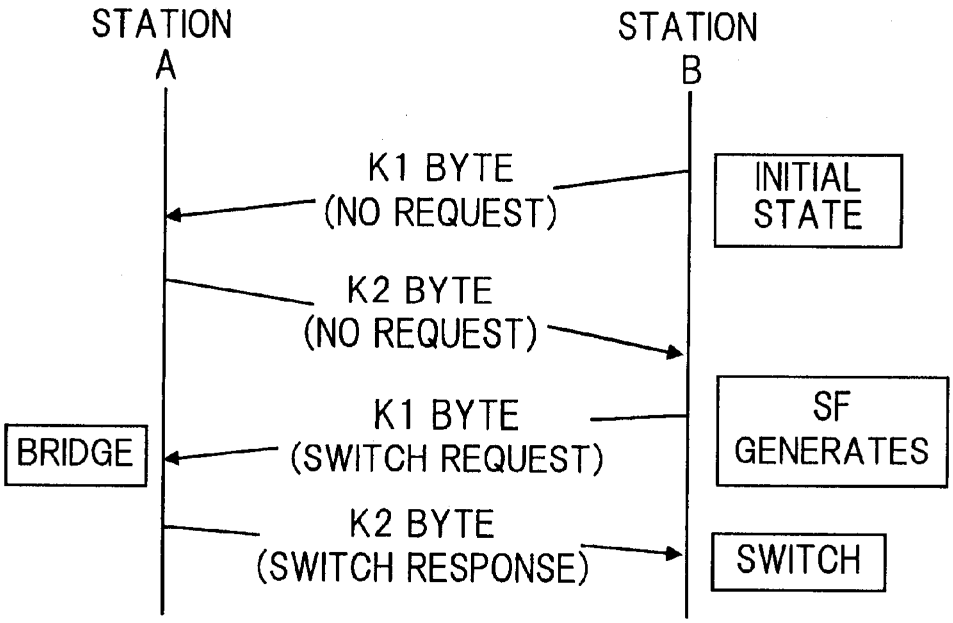
FIGS. 13A and 13B are sequences for sending and receiving K1, K2 bytes.
Figure 13B:
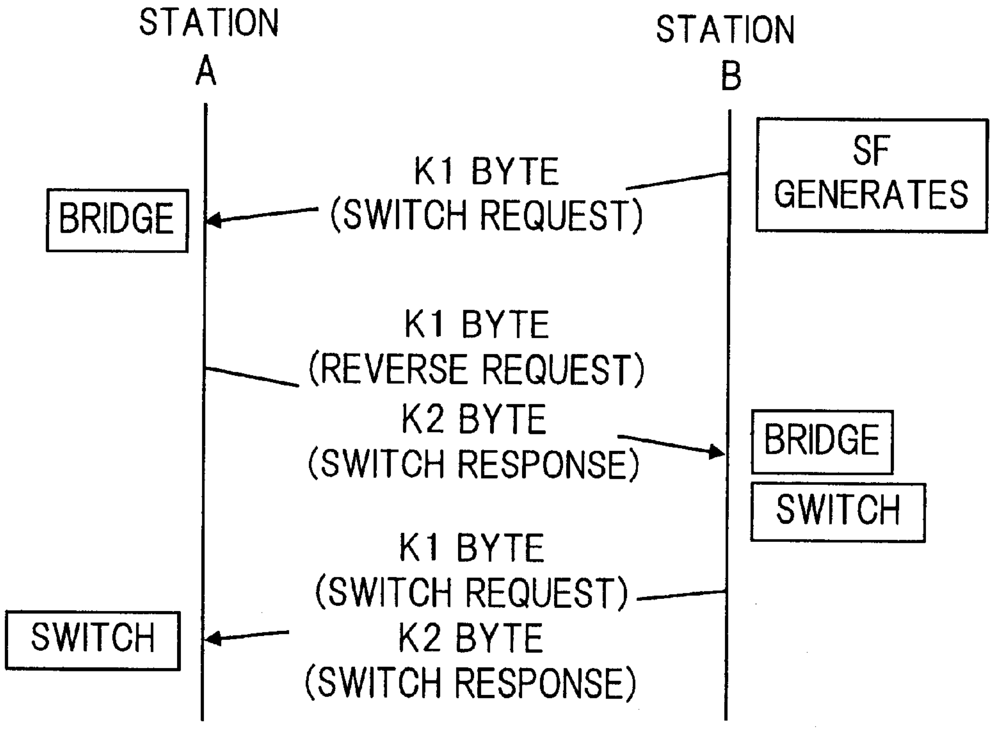
Figure 14:
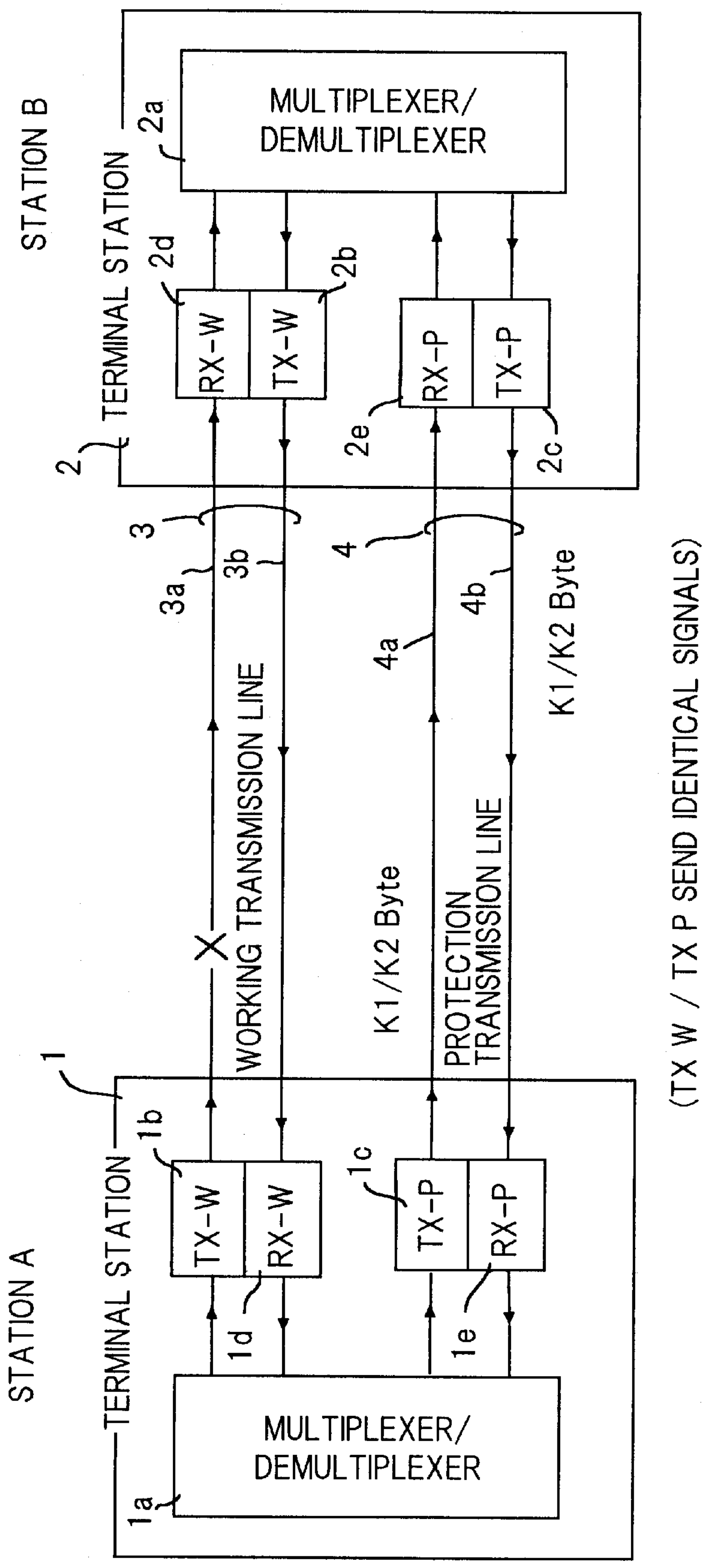
FIG. 14 is a diagram showing a switching scheme based upon line protection.
Figure 15:
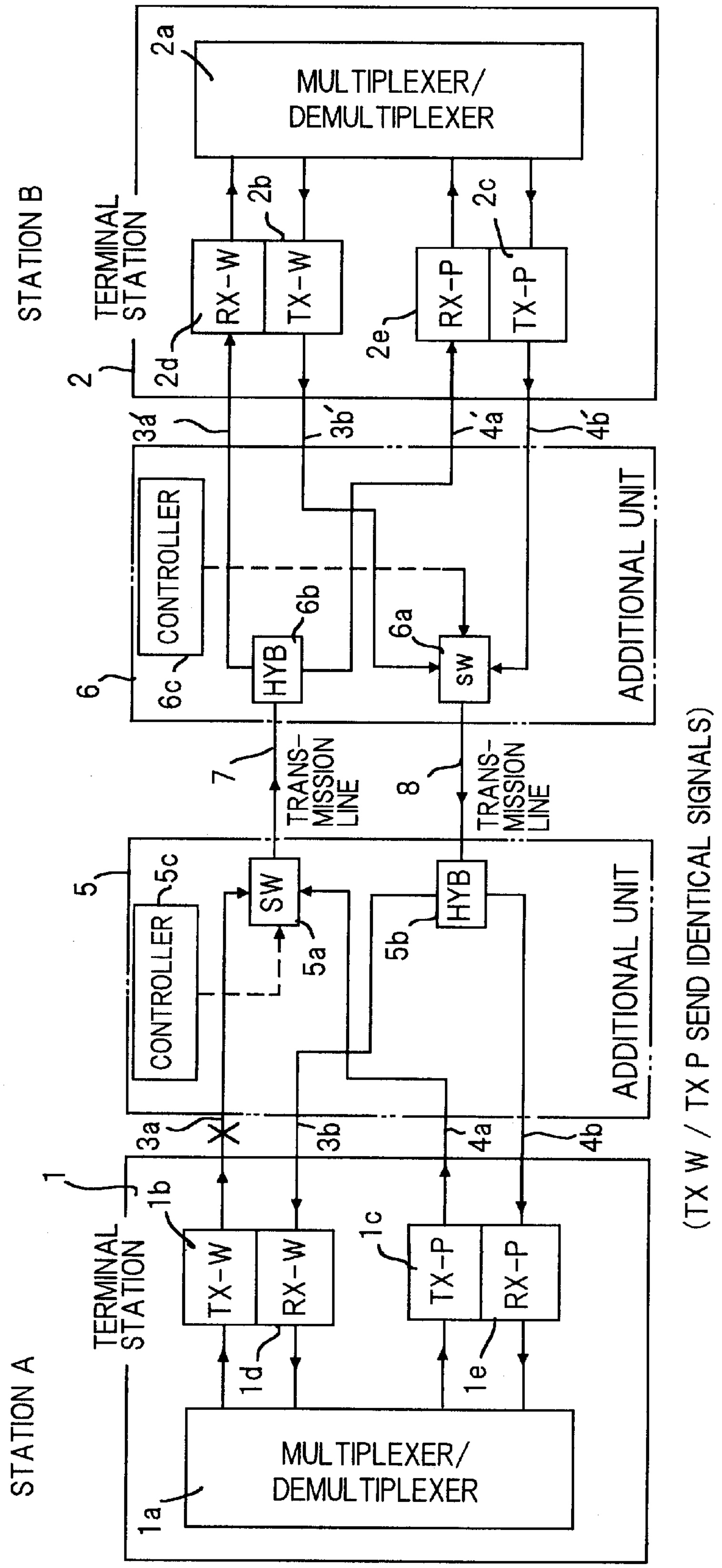
FIG. 15 is a communication system not having line redundancy.
Figure 16:
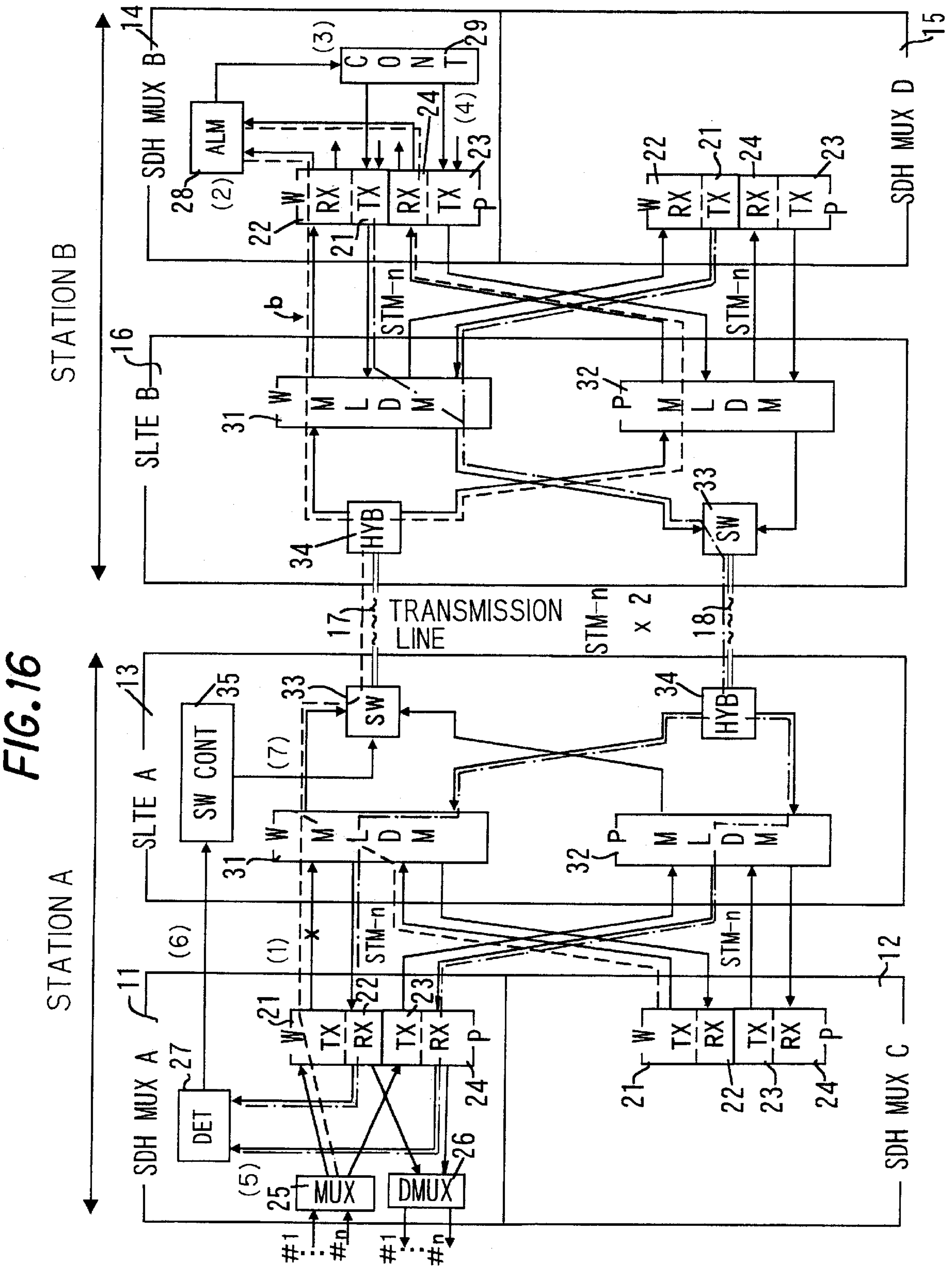
FIG. 16 is a diagram showing the configuration of a prior-art communication system in which line switching is made possible even if failure is detected in both working and protection lines simultaneously.

FIG. 9 is a diagram showing the construction of a line switching arrangement according to a fourth embodiment of the present invention. Components identical with those shown in FIG. 1 are designated by like reference characters.

This arrangement includes the opposing station alarm detector (DET/CONT) 88 provided in the higher level unit 53 of station A for determining whether the opposing station alarm is being sent by the K1 byte of the overhead bytes OHB in the working and protection main signals sent from station B, and instructing the switch 73 to perform line switching based upon the results of the determination.

This arrangement further includes the alarm signal generator (ALM GEN) 90 for notifying the working and protection transmitters 61, 63 of the SDH unit 54 that a line failure has occurred. Upon receiving notification of line failure, the transmitters 61, 63 notify station A of the occurrence of the failure using the K1 byte of the overhead bytes OHB in the working and protection main signals.

The arrangement of FIG. 9 further includes the pattern generator 93 provided in the higher level unit 53 of station A for constantly generating W and P patterns and inputting the W and P patterns to the working and protection transmitters 61, 63, respectively, of the SDH unit 51. The working and protection transmitters 61, 63 insert the W and P patterns into the working and protection main signals using the undefined bytes D1~D12, F1, E1, E2 among the overhead bytes OHB of the main signals and send the resulting signals to station B.

This embodiment further includes the pattern detector (DET) 94 provided in the higher level unit 56 of station B. The working and protection receivers 62, 64 of station B identify the patterns, which have been sent by the undefined bytes D1~D12, F1, E1, E2 among the overhead bytes OHB of the main signals, and input the patterns to the pattern detector 92. The latter compares the patterns that have entered from the working and protection receivers 62, 64 with an already known pattern (W or P pattern) and determines whether the compared patterns match. If neither pattern matches the known pattern, the pattern detector 94 inputs a signal indicative of non-matching to the alarm signal generator 90.

(f-2) Line Switching Control

The working and protection transmitters 61, 63 of the SDH unit 51 of station A insert the W and P patterns entering from the pattern generator 93 into the working and protection main signals using the undefined bytes of the overhead bytes OHB and input the main signals to the working and protection multiplexers 81*a*, 81*b* of the higher level unit 53. The working multiplexer 81*a* time-division multiplexes the working signals from the SDH units 51 and 52 (the latter of which is not shown) and inputs the resulting multiplexed signal to the switch 73. Further, the protection multiplexer 81*b* time-division multiplexes the protection signals from the SDH units 51 and 52 (the latter of which is not shown) and inputs the resulting multiplexed signal to the switch 73. The switch 73 selects the signal from the working multiplexer 81*a* (the signal in which the W pattern has been inserted), for example, and sends the selected signal to the transmission line 57.

The hybrid circuit 74 of the higher level unit 56 of station B inputs the multiplexed signal, which has been transmitted from station A via the transmission line 57, to the working and protection demultiplexers 82*a*, 82*b*. The working demultiplexer 82*a* demultiplexes the input working multiplexed signal and inputs the demultiplexed main signals to the working receivers 62 of the respective SDH units 54, 55 (the latter of which is not shown). The working receiver 62 sends this signal to the outside as the working signal, extracts the W pattern from the undefined bytes of the overhead bytes OHB of the main signals and inputs the W pattern to the pattern detector 94.

Under these normal operating conditions, the patterns extracted by the working and protection receivers 62, 64 match the W pattern. Accordingly, the pattern detector 94 inputs a signal indicative of pattern matching to the alarm signal generator 90 and the alarm signal generator 90 recognizes the fact that a line failure has not occurred. As a result, notification of line failure is not indicated by the overhead bytes (K1 byte) and, hence, the opposing station alarm detector 88 does not switch lines.

If the working line develops a fault at point a under these conditions, the patterns output by the working and protection receivers 62, 64 will no longer match the known W pattern owing to signal failure or signal degradation. As a result, the pattern detector 94 inputs a signal indicative of non-matching to the alarm signal generator 90. In response, the alarm signal generator 90 notifies the working and protection transmitters 61, 63 of the SDH unit 54 of the occurrence of line failure. In response to such notification, the working and protection transmitters 61, 63 transmit the opposing station alarm by the overhead bytes OHB.

The working and protection receivers 62, 64 of station A each extract the K1 byte of the overhead bytes OHB and input the K1 byte to the opposing station alarm detector 88. In response to the K1 byte of the overhead bytes OHB, the opposing station alarm detector 88 is notified of line failure and instructs the switch 73 to switch lines.

It should be noted that when operation is normal, station B sends station A the identified pattern (the pattern to be received by station B) by the overhead bytes OHB. When notification of line failure is given, station B sends station A the pattern to be received, along with the opposing station alarm, by the overhead bytes OHB. As a result, station A is capable of identifying the faulty route when the opposing station alarm is received and instructs the switch 73 to switch lines from the faulty line to the normal line based upon the identification made. When line switching is completed, the line identification pattern is changed over and this pattern is sent back to the higher level unit 53 of station A via the higher level unit 56 of station B. At this time, therefore, switching is performed reliably owing to verification of the presence or absence of an alarm, whereby it can be confirmed whether the alarm has been eliminated.

Thus, in accordance with the sixth embodiment, effects similar to those of the first embodiment can be obtained. Moreover, even if a terminal station does not possess a function for multiplexing the additional data ADDT onto main signals and then transmitting the same, a pattern or opposing station alarm can be sent to the terminal station of the other party by the overhead bytes OHB so that line switching can be carried out.

Thus, in accordance with the present invention as described above, the higher level units are allowed to perform the transmission and detection of the opposing station alarm, which are operations that have heretofore been performed by the SDH units. As a result, the SDH units can be standardized while the procedure involving the opposing station alarm is left to be executed in conformity with the international standard.

Further, in accordance with the present invention, working and protection route identification patterns are sent along with main signals, thereby making it possible to perform line switching correctly by identifying the faulty route. Moreover, unnecessary line switching is not carried out when a failure occurs in the transmission line of a communication system not having transmission line redundancy.

In accordance with the present invention, line switching can be performed upon detecting line failure quickly and accurately based upon non-matching of inserted and detected patterns even in a case where line failure cannot be definitely detected based upon signal failure or signal degradation.

In accordance with the present invention, a pattern or opposing station alarm can be sent to the terminal station of the other party by overhead bytes so that line switching can be carried out even if a terminal station does not possess a function for multiplexing the additional data onto main signals and then transmitting the same.

As many apparently widely different embodiments of the present invention can be made without departing from the spirit and scope thereof, it is to be understood that the invention is not limited to the specific embodiments thereof except as defined in the appended claims.

What is claimed is:

1. A method of switching between redundant routes of a communication system provided with first and second terminal stations each having a first apparatus for sending working/protection main signals toward the opposing terminal station and receiving working/protection main signals from the opposing terminal station, and a second apparatus for selecting, and sending to the opposing terminal station, one of the working/protection main signals output from the first apparatus toward the opposing terminal station, and for branching a main signal, which has been sent from the opposing terminal station, and inputting the branched signals to the first apparatus as working/protection main signals, the second apparatuses of the first and second terminal stations being connected by an uplink transmission line and a downlink transmission line that are devoid of redundancy, the method comprising:

adopting working/protection redundancy for the first and second apparatuses constituting each terminal station;

in the first terminal station, multiplexing a working-route identification pattern onto a working main signal as additional data, multiplexing a protection route identification pattern onto a protection main signal as additional data, selecting one of the working/protection main signals and sending the selected signal to the second terminal station via the uplink transmission line;

in the second terminal station, identifying the pattern that has been multiplexed onto the signal sent from the first terminal station and detecting line failure of the first terminal station by monitoring signal degradation or signal failure of the signal sent from the first terminal station;

when line failure has been detected in the second terminal station, multiplexing additional data, which includes a line failure alarm and a failed route decided from the identification pattern, onto the main signal and sending the main signal to the first terminal station via the downlink transmission line; and in the first terminal station, performing line switching based upon the alarm and the failed route included in the additional data.

2. A method of switching between redundant routes of a communication system provided with first and second terminal stations each having a first apparatus for sending working/protection main signals toward the opposing terminal station and receiving working/protection main signals from the opposing terminal station, and a second apparatus for selecting, and sending to the opposing terminal station, one of the working/protection main signals output from the first apparatus toward the opposing terminal station, and for branching a main signal, which has been sent from the opposing terminal station, and inputting the branched signals to the first apparatus as working/protection main signals, the second apparatuses of the first and second terminal stations being connected by an uplink transmission line and a downlink transmission line that are devoid of redundancy, the method comprising:

adopting working/protection redundancy for the first and second apparatuses constituting each terminal station;

in the first terminal station, inserting a fixed pattern into working and protection main signals using overhead bytes, selecting one of the working and protection main signals and sending the selected signal to the second terminal station via the uplink transmission line;

in the second terminal station, restoring the pattern, which has been inserted into the main signal sent from the first terminal station, by referring to the overhead bytes; in the second terminal station, comparing the restored pattern with the fixed pattern;

in a case where the restored pattern does not match the fixed pattern, multiplexing additional data, which includes a line failure alarm, onto the main signal, in the second terminal station and sending the main signal to the first terminal station via the downlink transmission line; and in the first terminal station, performing line switching upon identifying the alarm included in the additional data.

3. A method of switching between redundant routes of a communication system provided with first and second terminal stations each having a first apparatus for sending working/protection main signals toward the opposing terminal station and receiving working/protection main signals from the opposing terminal station, and a second apparatus for selecting, and sending to the opposing terminal station, one of the working/protection main signals output from the first apparatus toward the opposing terminal station, and for branching a main signal, which has been sent from the opposing terminal station, and inputting the branched signals to the first apparatus as working/protection main signals, the second apparatuses of the first and second terminal stations being connected by an uplink transmission line and a downlink transmission line that are devoid of redundancy, the method comprising:

adopting working/protection redundancy for the first and second apparatuses constituting each terminal station;

in the first terminal station, inserting a working-route identification pattern into a working main signal and a protection-route identification pattern into a protection main signal using overhead bytes, selecting one of the working and protection main signals and sending the selected signal to the second terminal station via the uplink transmission line;

in the second terminal station, restoring the pattern, which has been inserted into the main signal sent from the first terminal station, by referring to the overhead bytes;

in a case where the restored pattern does not match the working-route or protection-route identification pattern, multiplexing additional data, which includes a line failure alarm and a failed route, onto the main signal in the second terminal station and sending the main signal to the first terminal station via the downlink transmission line; and in the first terminal station, performing line switching based upon the alarm and the failure route included in the additional data.

4. A method of switching between redundant routes of a communication system provided with first and second terminal stations each having a first apparatus for sending working/protection main signals toward the opposing terminal station and receiving working/protection main signals from the opposing terminal station, and a second apparatus for selecting, and sending to the opposing terminal station, one of the working/protection main signals output from the first apparatus toward the opposing terminal station, and for branching a main signal, which has been sent from the opposing terminal station, and inputting the branched signals to the first apparatus as working/protection main signals, the second apparatuses of the first and second terminal stations being connected by an uplink transmission line and a downlink transmission line that are devoid of redundancy, the method comprising:

adopting working/protection redundancy for the first and second apparatuses constituting each terminal station;

in the first terminal station, inserting a fixed pattern into working and protection main signals using overhead bytes, selecting one of the working and protection main signals and sending the selected signal to the second terminal station via the uplink transmission line;

in the second terminal station, restoring the pattern, which has been inserted into the main signal sent from the first terminal station, by referring to the overhead bytes; in the second terminal station, comparing the restored pattern with the fixed pattern;

in a case where the restored pattern does not match the fixed pattern, inserting a line failure alarm into a main signal using overhead bytes in the second terminal station and sending the signal to the first terminal station via the downlink transmission line; and in the first terminal station, determining whether notification of a line failure alarm has been given by referring to the overhead bytes and, if notification of the alarm has been given, performing line switching.

5. A method of switching between redundant routes of a communication system provided with first and second terminal stations each having a first apparatus for sending working/protection main signals toward the opposing terminal station and receiving working/protection main signals from the opposing terminal station, and a second apparatus for selecting, and sending to the opposing terminal station, one of the working/protection main signals output from the first apparatus toward the opposing terminal station, and for branching a main signal, which has been sent from the opposing terminal station, and inputting the branched signals to the first apparatus as working/protection main signals, the second apparatuses of the first and second terminal stations being connected by an uplink transmission line and a downlink transmission line that are devoid of redundancy, the method comprising:

adopting working/protection redundancy for the first and second apparatuses constituting each terminal station; in the first terminal station, inserting a working-route identification pattern into a working main signal and a protection-route identification pattern into a protection main signal using overhead bytes, selecting one of the working and protection main signals and sending the selected signal to the second terminal station via the uplink transmission line;

in the second terminal station, restoring the pattern, which has been inserted into the main signal sent from the first terminal station, by referring to the overhead bytes;

in a case where the restored pattern does not match the identification pattern, inserting a line failure alarm and a failed route into a main signal using overhead bytes in the second terminal station and sending the signal to the first terminal station via the downlink transmission line; and in the first terminal station, performing line switching upon identifying the line failure alarm and the failed route by referring to the overhead bytes.

6. A method, comprising:

adopting working/protection redundancy for a first terminal station and a second terminal station;

multiplexing in the first terminal station a working-route identification pattern onto a working main signal as additional data;

multiplexing in the first terminal station a protection route identification pattern onto a protection main signal as additional data; and selecting in the first terminal station one of the working/protection main signals and sending the selected signal to the second terminal station via the uplink transmission line.

7. The method as recited in claim 6, further comprising:

identifying in the second terminal station the pattern that has been multiplexed onto the signal sent from the first terminal station; and detecting line failure of the first terminal station by monitoring signal degradation or signal failure of the signal sent from the first terminal station.

8. The method as recited in claim 7, further comprising:

when line failure has been detected in the second terminal station, multiplexing additional data, which includes a line failure alarm and a failed route decided from the identification pattern, onto the main signal and sending the main signal to the first terminal station via the downlink transmission line; and in the first terminal station, performing line switching based upon the alarm and the failed route included in the additional data.

* * * * *

UNITED STATES PATENT AND TRADEMARK OFFICE
CERTIFICATE OF CORRECTION

PATENT NO. : 6,256,291 B1
DATED : July 3, 2001
INVENTOR(S) : Hirofumi Araki

It is certified that error appears in the above-identified patent and that said Letters Patent is hereby corrected as shown below:

Title page,
Item [54], after "TRANSMISSION" insert -- LINES --.
Priority Data inserted -- Japan 9-273996 October 7, 1997 --.

Signed and Sealed this

Fourteenth Day of May, 2002

*Attest:*

JAMES E. ROGAN
*Director of the United States Patent and Trademark Office*

*Attesting Officer*